(12) United States Patent
Coyle

(10) Patent No.: US 7,571,125 B2
(45) Date of Patent: Aug. 4, 2009

(54) CASH FLOW MANAGEMENT SYSTEM

(76) Inventor: Robert L. Coyle, P.O. Box 459, Guilderland, NY (US) 12084

( * ) Notice: Subject to any disclaimer, the term of this patent is extended or adjusted under 35 U.S.C. 154(b) by 1731 days.

(21) Appl. No.: 10/106,998

(22) Filed: Mar. 26, 2002

(65) Prior Publication Data

US 2003/0187762 A1 Oct. 2, 2003

(51) Int. Cl.
*G07F 19/00* (2006.01)
(52) U.S. Cl. ............ 705/30; 705/35; 705/36 R
(58) Field of Classification Search ........ None
See application file for complete search history.

(56) References Cited

U.S. PATENT DOCUMENTS

| 5,358,278 | A | * | 10/1994 | Ellis | ............ 281/31 |
| 6,021,397 | A | | 2/2000 | Jones et al. | |
| 6,064,984 | A | | 5/2000 | Ferguson et al. | |
| 2002/0095363 | A1 | * | 7/2002 | Sloan et al. | ............ 705/36 |
| 2002/0161678 | A1 | * | 10/2002 | Jaffe | ............ 705/35 |

FOREIGN PATENT DOCUMENTS

JP 2002023994 * 1/2002

OTHER PUBLICATIONS

"Graphic Spreadsheet", Fortune, Aug. 23, 1993, vol. 128, iss. 4, p. 101.*

* cited by examiner

*Primary Examiner*—F. Zeender
*Assistant Examiner*—M. Thein
(74) *Attorney, Agent, or Firm*—Schmeiser, Olsen & Watts

(57) ABSTRACT

An integrated cash flow management system and associated worksheets, including an expense worksheet and a money flow worksheet. The expense worksheet comprises a first medium having: a 3-circles block that includes alpha expenses (i.e., expenses paid every month or more frequently), a right rectangle block that include beta expenses (i.e., expenses paid less frequently than every month), and additional expenses blocks that include both alpha expenses and beta expenses. The 3-circles block may include expenses for long-term savings, investments, and insurance. The right rectangle block may include expenses for car replacement, vacations, gifts, and emergencies. The money flow worksheet comprises a second medium having: a debt workblock, a save-to-spend workblock, a savings icon, an investment icon, an insurance icon, a first directional flow indicator from the savings icon to the investment icon, and a second directional flow indicator from the insurance icon to the investment icon.

31 Claims, 15 Drawing Sheets

WORKSHEET A (PART 1)    RUN # 1

41   31     32   42

| | HOUSING & HOUSING RELATED | | RED CHECK MARK ITEMS | |
|---|---|---|---|---|
| 1. $ (927) | RENT OR MORTGAGE (PRINCIPAL & INTEREST ONLY) | | 1A. $ | |
| 2. $ (50) | MORTGAGE PREPAYMENTS OF PRINCIPAL | | 2A. $ | |
| 3. $ 100 | PROPERTY TAXES    1200 | | 3A. $ | |
| 4. $ 200 | SCHOOL TAXES    2400 | | 4A. $ | |
| 5. $ | WATER & SEWER BILL   (FALL DUE 2X/YR) | 96 | 5A. $ 8 | |
| 6. $ | HOMEOWNERS INSURANCE | 360 | 6A. $ 30 | |
| 7. $ | MORTGAGE LIFE AND DISABILITY INSURANCE | | 7A. $ | |
| 8. $ 140 | UTILITY COMPANY FOR GAS AND ELECTRIC   BUDGET PLAN | | 8A. $ | |
| 9. $ | HEATING OIL, PROPANE, WOOD, (HVAC MAINTENANCE) | 240 | 9A. $ 20 | |
| 10. $ 110 | (PHONE)(CELL PHONE)(ISP)(CATV)   35,20, 20, 35 | | 10A. $ | |
| 11. $ 15 | TRASH COLLECTION | | 11A. $ | |
| 12. $ | CLEANING SERVICE | | 12A. $ | |
| 13. $ | SNOW CONTRACT | | 13A. $ | |
| 14. $ | LAWN CONTRACT | | 14A. $ | |
| 15. $ | GARDENING EXPENSES | 240 | 15A. $ 20 | |
| 16. $ | SWIMMING POOL EXPENSES | 300 | 16A. $ 25 | |
| 17. $ | HOME MAINTENANCE & UPKEEP | 500 | 17A. $ 42 | |
| 18. $ | HOUSEHOLD ITEMS (NOT CONSUMABLES) | | 18A. $ | |

(1542) on left for housing total; (145) on right.

| | FOOD | | | |
|---|---|---|---|---|
| 19. $ 390 | BASIC MONTHLY GROCERY EXPENSE   90/WK -NOT SURE (ALL HOUSEHOLD CONSUMABLES) | | 19A. $ | |
| 20. $ 65 | WORK-RELATED MEALS AWAY FROM HOME   $3 PER DAY X 5 X 52 ÷ 12 (YOU'RE AT THE JOB SITE AND YOU DON'T BRING A SANDWICH FROM HOME) | | 20A. $ | |

(455) on left for food.

| | PERSONAL/FAMILY & PETS | | | |
|---|---|---|---|---|
| 21. $ 538 | CHURCH, OFFERINGS, SYNAGOGUE, & OTHER CHARITIES | | 21A. $ | |
| 22. $ | MD, DDS, PRESCRIPTIONS, VISION CARE (NOT COVERED BY HEALTH INSURANCE) | 300 | 22A. $ 25 | |
| 23. $ | CHIROPRACTOR | | 23A. $ | |
| 24. $ | ORTHODONTIST | | 24A. $ | |
| 25. $ | CLOTHING   (OTHER THAN CLOTHING GIVEN AS GIFTS) | 800 | 25A. $ 67 | |
| 26. $ | EDUCATION   (SELF AND CHILDREN) | | 26A. $ | |
| 27. $ | MEMBERSHIP DUES OR FEES   (YMCA) | 400 | 27A. $ 33 | |
| 28. $ | CHILDREN'S ACTIVITIES   (SPORTS, PIANO, ETC) | 600 | 28A. $ 50 | |
| 29. $ | CHILDREN'S ALLOWANCES | | 29A. $ | |
| 30. $ | OCCASIONAL HELP GIVEN TO GROWN CHILDREN | | 30A. $ | |
| 31. $ | PETS: VET, GROOMING, CLEANING, BOARDING (PUT PET FOOD IN LINE 19) | 200 | 31A. $ 17 | |
| 32. $ 15 | LAUNDRY AND DRY CLEANING | | 32A. $ | |
| 33. $ 20 | HAIR CUTS AND HAIR CARE | | 33A. $ | |
| 34. $ 25 | POCKET MONEY (FOR EXPENSES NOT OTHERWISE LISTED) (PA AMERICA) | | 34A. $ | |
| 35. $ 25 | POCKET MONEY (FOR EXPENSES NOT OTHERWISE LISTED) (MA AMERICA) | | 35A. $ | |

(623) on left; (192) on right.

WORKSHEET A (PART 2)    RUN # 1

| | | | | | |
|---|---|---|---|---|---|
| | | DINING OUT, HOBBIES, COMPUTER | | RED CHECK MARK ITEMS | |
| | 36. $ 100 | RESTAURANTS, TAKE-OUT FOOD, MOVIES, VCRS, ETC. | | 36A. $ | |
| | 37. $ | BUYING COLLECTIBLES | | 37A. $ | |
| (100) | 38. $ | PERSONAL INTERESTS AND HOBBIES (BOATING, FISHING, HUNTING, GOLF, SKIING, CRAFTS, HEALTH CLUB, MARTIAL ARTS, ETC.) →300 →100 | 400 | 38A. $ 33 | (33) |
| | 39. $ | COMPUTER EXPENSES | | 39A. $ | |
| | | TRANSPORTATION | | | |
| | 40. $ 406 | CAR LOAN PAYMENTS (CAR # 1) | | 40A. $ | |
| | 41. $ 193 | CAR LEASE PAYMENTS (CAR # 2) | | 41A. $ | |
| (784) | 42. $ 175 | CAR FUEL EXPENSE | | 42A. $ | (20) |
| | 43. $ | BUS, CARPOOLING, OR OTHER COMMUTING EXPENSE | | 43A. $ | |
| | 44. $ 10 | TOLLS, PARKING, WASHES | | 44A. $ | |
| | 45. $ | CAR MAINTENANCE, REPAIRS, AND PLATES | 240 | 45A. $ 20 | |
| | | INSURANCE | | | |
| | 46. $ | HEALTH INSURANCE (MAKE NO ENTRY IF THE PREMIUM IS PAID THROUGH WORK) | | 46A. $ | |
| | 47. $ | AUTOMOBILE INSURANCE | 1,600 | 47A. $ 133 | (133) |
| | 48. $ | UMBRELLA LIABILITY INSURANCE, PERSONAL IDENTITY INSURANCE | | 48A. $ | |
| | 49. $ | BOAT AND PERSONAL ARTICLES INSURANCE | | 49A. $ | |
| | 50. $ | PROFESSIONAL LIABILITY INSURANCE | | 50A. $ | |
| | | LOANS, IRS, STATE INCOME TAX | | | |
| | 51. $ | STUDENT LOAN(S) | | 51A. $ | |
| | 52. $ | HOME EQUITY LOAN OR LINE OF CREDIT | | 52A. $ | |
| (408) | 53. $ 81 | PERSONAL LOANS (PAID TO A BANK OR PERSON) 401(K) LOAN | | 53A. $ | |
| | 54. $ 327 | CREDIT CARDS 7,000; 2 YRS (IF NO EMERGENCY ARISES) (MAKE NO ENTRY IF YOU PAY THE BALANCE IN FULL EACH MONTH) | | 54A. $ | |
| | 55. $ | PAYMENTS TO THE IRS | | 55A. $ | |
| | 56. $ | PAYMENTS TO STATE INCOME TAX | | 56A. $ | |
| | | MISCELLANEOUS | | | |
| | 57. $ | SPOUSAL/CHILD SUPPORT | | 57A. $ | |
| | 58. $ | CHILD CARE | | 58A. $ | |
| | 59. $ | BABYSITTING | | 59A. $ | |
| | 60. $ | TAX PREPARATION | 240 | 60A. $ 20 | |
| | 61. $ | LEGAL FEES | | 61A. $ | |
| | 62. $ | PROFESSIONAL LICENSE FEES (RN) | 60 | 62A. $ 5 | |
| (10) | 63. $ 10 | NEWSPAPERS & MAGAZINES | | 63A. $ | (175) |
| | 64. $ | MULTI-LEVEL MARKETING (MLM) MEETINGS, TAPES | 1800 | 64A. $ 150 | |
| | 65. $ | | | 65A. $ | |
| | 66. $ | | | 66A. $ | |

FROM *FIG. 2A*

| | | RIGHT RECTANGLE | | | |
|---|---|---|---|---|---|
| 67. $ | | CAR # 1 REPLACEMENT (NEEDS RETHINKING) | | 67A. $ | ? |
| 68. $ | | CAR # 2 REPLACEMENT (NEEDS RETHINKING) | | 68A. $ | ? |
| 69. $ | | VACATIONS | 2,400 | 69A. $ | 200 |
| 70. $ | | GIFTS | 1,890 | 70A. $ | 158 |
| | | (HOLIDAYS, BIRTHDAYS, WEDDINGS, ANNIVERSARIES, SHOWERS, ETC.) | | | |
| 71. $ | | EMERGENCIES | | 500  71A. $ | 42 |
| | | 3 CIRCLES | | | |
| 72. $ | | LONG-TERM SAVINGS | | 72A. $ | |
| 73. $ | | INVESTMENTS | | 73A. $ | |
| 74. $ | 35 | INSURANCE FOR LIFE, DISABILITY, & LONG-TERM HEALTH CARE | | 74A. $ | |

3,957      1,098

CASH FLOW SUMMARY    INCOME  $ 4,962 (-)    EXPENSES  $ 5,055 (=)    CASH FLOW  $ 93-

*FIG. 2B*

| WORKSHEET C (PART 1) | RUN # 1 |
|---|---|

1. THESE ITEMS ARE HANDLED BY YOUR CHECKING ACCOUNT AND ALL THE REST BY $AVE TO $PEND

| LINE # | AMOUNT | CATEGORY |
|---|---|---|
| 1 | $ 927 | MORTGAGE |
| 2 | $ 50 | MTG PRE-PAYMENTS |
| 3 | $ 100 | PROPERTY TAXES |
| 4 | $ 200 | SCHOOL TAXES |
| 8 | $ 140 | NIAGARA MOHAWK |
| 10 | $ 110 | PHONES, ISP, CATV |
| 11 | $ 15 | TRASH |
| 19 | $ 390 | GROCERIES |
| 20 | $ 65 | WORK MEALS |
| 21 | $ 538 | CHURCH |
| 32 | $ 15 | LAUNDRY |
| 33 | $ 20 | HAIRCUTS |
| 34 | $ 25 | POCKET $ - MA |
| 35 | $ 25 | POCKET $ - PA |
| 36 | $ 100 | RESTAURANTS |
| 40 | $ 406 | EXPLORER LOAN |
| 41 | $ 193 | ESCORT LOAN |
| 42 | $ 175 | CAR FUEL |
| 44 | $ 10 | TOLLS, PARK, WASHES |
| 53 | $ 81 | PERSONAL LOAN |
| 54 | $ 327 | CREDIT CARDS |
| 63 | $ 10 | NEWSPAPERS, MAGS |
|  | $ |  |
|  | $ |  |
|  | $ |  |
|  | $ |  |
|  | $ |  |
| 72 | $ | LONG-TERM SAVINGS |
| 73 | $ | INVESTMENTS |
| 74 | $ 35 | INSURANCE |
|  | TOTAL: $ 3,957 | |

THESE ITEMS OCCUR FREQUENTLY.
FOR MOST ITEMS, THE AMOUNTS ARE PREDICTABLE

2. ITEMS HANDLED BY YOUR $AVE TO $PEND ACCOUNT (YOUR RIGHT RECTANGLE)

| LINE # | MONTHLY AMOUNT | ANNUAL AMOUNT | CATEGORY |
|---|---|---|---|
| 67A | $ ? | $ ? | CAR #1 REPLACEMENT $4,790 |
| 68A | $ ? | $ ? | CAR #2 REPLACEMENT |
| 69A | $ 200 | $ 2400 | VACATIONS |
| 70A | $ 158 | $ 1890 | GIFTS |
| 71A | $ 42 | $ 500 | EMERGENCIES |
| 5A √ | $ 8 | $ 96 | WATER BILL |
| 6A √ | $ 30 | $ 360 | HO POLICY |
| 9A √ | $ 20 | $ 240 | HVAC MAINT. |
| 15A √ | $ 20 | $ 240 | GARDENING |
| 16A √ | $ 25 | $ 300 | SWIMMING POOL |
| 17A √ | $ 42 | $ 500 | HOME MAINT. |
| 22A √ | $ 25 | $ 300 | UNINSURED MEDICAL |
| 25A √ | $ 67 | $ 800 | CLOTHING |
| 27A √ | $ 33 | $ 400 | YMCA |
| 28A √ | $ 50 | $ 600 | SPORTS, PIANO |
| 31A √ | $ 17 | $ 200 | PETS |
| 38A √ | $ 33 | $ 400 | GOLF, CRAFTS |
| 45A √ | $ 20 | $ 240 | CAR MAINT. |
| 47A √ | $ 133 | $ 1600 | CAR INSURANCE |
| 60A √ | $ 20 | $ 240 | TAX PREP. |
| 62A √ | $ 5 | $ 60 | RN FEES |
| 64A √ | $ 150 | $ 1800 | MLM COSTS |
| √ | $ | $ | |
| √ | $ | $ $8,376 |
| √ | $ | $ | |

MONTHLY TOTAL: $ 1,098  ANNUAL TOTAL: $ 13,166

THESE ITEMS OCCUR LESS FREQUENTLY. FOR SOME ITEMS, THE AMOUNTS ARE UNPREDICTABLE. (WE ESTIMATED THOSE EXPENSES).
GET "SEED MONEY" INTO THIS ACCOUNT AS SOON AS POSSIBLE, SO YOU DON'T HAVE TO PLAY "CATCH UP". ADD MONEY EACH TIME YOU GET PAID.

NOTES ON REAL ESTATE RENTAL INCOME

| PRINCIPAL $ | # OF UNITS |
| INTEREST $ | # PAYING RENT NOW |
| TAXES $ | TOTAL CURRENT RENTS $ |
| INSURANCE $ | COSTS = $ |
| MAINTENANCE $ | RENTS = $ |
| TOTAL COSTS $ | CASH FLOW (BEFORE DEPRECIATION) $ |

*FIG. 4*

WORKSHEET C (PART 2)    RUN # 1

| 3. | "SEED MONEY" FOR YOUR $AVE TO $PEND ACCOUNT | | |
|---|---|---|---|
| CATEGORY | $ | OF | $ |
| | | OF | |
| | | OF | |
| VACATIONS | 1200 | OF | 2400 |
| GIFTS | 945 | OF | 1890 |
| EMERGENCIES | 250 | OF | 500 |
| WATER BILL | 24 | OF | 96 |
| H.O. POLICY | 150 | OF | 360 |
| HVAC | 120 | OF | 240 |
| GARDEN | 0 | OF | 240 |
| SWIMMING | 0 | OF | 300 |
| HOME MAINT. | 200 | OF | 500 |
| UNINSURED RX | 100 | OF | 300 |
| CLOTHING | 300 | OF | 800 |
| YMCA | 235 | OF | 400 |
| SPORTS, PIANO | 200 | OF | 600 |
| PETS | 75 | OF | 200 |
| GOLF, CRAFTS | 300 | OF | 400 |
| CAR MAINT. | 50 | OF | 240 |
| CAR INSURANCE | 1065 | OF | 1600 |
| TAX PREP | 40 | OF | 240 |
| RN FEES | 0 | OF | 60 |
| MLM | 900 | OF | 1800 |
| TOTAL: | $ 6,157 | | |

GET THIS AMOUNT AS QUICKLY AS POSSIBLE INTO YOUR $AVE TO $PEND ACCOUNT.

| 4. | CALENDAR OF PREDICTABLE WITHDRAWALS (TRANSFER MONEY OUT OF $AVE TO $PEND ACCOUNT INTO YOUR REGULAR CHECKING ACCOUNT) |
|---|---|
| JAN | |
| FEB | |
| MAR | |
| APR | |
| MAY | |
| JUN | |
| JUL | $2400 VACATION |
| AUG | |
| SEP | |
| OCT | |
| NOV | |
| DEC | |

| 5. | YOUR $AVE TO $PEND ACCOUNT WILL "PRE-FUND" THESE EXPENSES. THESE FALL DUE AT UNPREDICTABLE TIMES | |
|---|---|---|
| CATEGORY OF EXPENSE | AMOUNT ESTIMATED | |
| EMERGENCIES | $ | 500 |
| HOME MAINT. | $ | 500 |
| UNINSURED MED. | $ | 300 |
| CLOTHING | $ | 800 |
| PETS | $ | 200 |
| CAR MAINT. | $ | 240 |
| TOTAL: | $ | 2,540 |

ALL THESE ARE PART OF YOUR $AVE TO $PEND ACCOUNT. THIS SIMPLE SYSTEM "PRE-FUNDS" EVERY EXPENSE. THERE IS NO NEED TO BE THROWN OFF STRIDE.

*FIG. 5*

WORKSHEET A (PART 1)    RUN # 2

*41*    *31*               *32*   *42*

| | | | | RED CHECK MARK ITEMS | |
|---|---|---|---|---|---|
| | | HOUSING & HOUSING RELATED | | | |
| | 1. $ 819 | RENT OR MORTGAGE (PRINCIPAL & INTEREST ONLY) | | 1A. $ | |
| | 2. $ 0 | MORTGAGE PREPAYMENTS OF PRINCIPAL | | 2A. $ | |
| | 3. $ 100 | PROPERTY TAXES    1200 | | 3A. $ | |
| | 4. $ 200 | SCHOOL TAXES    2400 | | 4A. $ | |
| | 5. $ | WATER & SEWER BILL (FALL DUE 2X/YR) | 96 | 5A. $ 8 | |
| | 6. $ | HOMEOWNERS INSURANCE | 360 | 6A. $ 30 | |
| | 7. $ | MORTGAGE LIFE AND DISABILITY INSURANCE | | 7A. $ | |
| (1384) | 8. $ 140 | UTILITY COMPANY FOR GAS AND ELECTRIC    BUDGET PLAN | | 8A. $ | (145) |
| | 9. $ | HEATING OIL, PROPANE, WOOD, HVAC MAINTENANCE | 240 | 9A. $ 20 | |
| | 10. $ 110 | PHONE, CELL PHONE, ISP, CATV | | 10A. $ | |
| | 11. $ 15 | TRASH COLLECTION | | 11A. $ | |
| | 12. $ | CLEANING SERVICE | | 12A. $ | |
| | 13. $ | SNOW CONTRACT | | 13A. $ | |
| | 14. $ | LAWN CONTRACT | | 14A. $ | |
| | 15. $ | GARDENING EXPENSES | 240 | 15A. $ 20 | |
| | 16. $ | SWIMMING POOL EXPENSES | 300 | 16A. $ 25 | |
| | 17. $ | HOME MAINTENANCE & UPKEEP | 500 | 17A. $ 42 | |
| | 18. $ | HOUSEHOLD ITEMS (NOT CONSUMABLES) | | 18A. $ | |
| | | FOOD | | | |
| (455) | 19. $ 390 | BASIC MONTHLY GROCERY EXPENSE (ALL HOUSEHOLD CONSUMABLES) | | 19A. $ | |
| | 20. $ 65 | WORK-RELATED MEALS AWAY FROM HOME (YOU'RE AT THE JOB SITE AND YOU DON'T BRING A SANDWICH FROM HOME) | | 20A. $ | |
| | | PERSONAL/FAMILY & PETS | | | |
| | 21. $ 538 | CHURCH, OFFERINGS, SYNAGOGUE, & OTHER CHARITIES | | 21A. $ | |
| | 22. $ | MD, DDS, PRESCRIPTIONS, VISION CARE (NOT COVERED BY HEALTH INSURANCE) | 300 | 22A. $ 25 | |
| | 23. $ | CHIROPRACTOR | | 23A. $ | |
| | 24. $ | ORTHODONTIST | | 24A. $ | |
| (623) | 25. $ | CLOTHING (OTHER THAN CLOTHING GIVEN AS GIFTS) | 800 | 25A. $ 67 | (192) |
| | 26. $ | EDUCATION (SELF AND CHILDREN) | | 26A. $ | |
| | 27. $ | MEMBERSHIP DUES OR FEES | 400 | 27A. $ 33 | |
| | 28. $ | CHILDREN'S ACTIVITIES | 600 | 28A. $ 50 | |
| | 29. $ | CHILDREN'S ALLOWANCES | | 29A. $ | |
| | 30. $ | OCCASIONAL HELP GIVEN TO GROWN CHILDREN | | 30A. $ | |
| | 31. $ | PETS: VET, GROOMING, CLEANING, BOARDING (PUT PET FOOD IN LINE 19) | 200 | 31A. $ 17 | |
| | 32. $ 15 | LAUNDRY AND DRY CLEANING | | 32A. $ | |
| | 33. $ 20 | HAIR CUTS AND HAIR CARE | | 33A. $ | |
| | 34. $ 25 | POCKET MONEY (FOR EXPENSES NOT OTHERWISE LISTED) (PA AMERICA) | | 34A. $ | |
| | 35. $ 25 | POCKET MONEY (FOR EXPENSES NOT OTHERWISE LISTED) (MA AMERICA) | | 35A. $ | |

WORKSHEET A (PART 2)    RUN # 2

| | | DINING OUT, HOBBIES, COMPUTER | | RED CHECK MARK ITEMS | |
|---|---|---|---|---|---|
| (100) | 36. $ 100 | RESTAURANTS, TAKE-OUT FOOD, MOVIES, VCRS, ETC. | | 36A. $ | (33) |
| | 37. $ | BUYING COLLECTIBLES | | 37A. $ | |
| | 38. $ | PERSONAL INTERESTS AND HOBBIES (BOATING, FISHING, HUNTING, GOLF, SKIING, CRAFTS, HEALTH CLUB, MARTIAL ARTS, ETC.) | 400 | 38A. $ 33 | |
| | 39. $ | COMPUTER EXPENSES | | 39A. $ | |
| | | TRANSPORTATION | | | |
| (185) | 40. $ 0 | CAR LOAN PAYMENTS (CAR # 1) | | 40A. $ | (20) |
| | 41. $ 0 | CAR LEASE PAYMENTS (CAR # 2) | | 41A. $ | |
| | 42. $ 175 | CAR FUEL EXPENSE | | 42A. $ | |
| | 43. $ | BUS, CARPOOLING, OR OTHER COMMUTING EXPENSE | | 43A. $ | |
| | 44. $ 10 | TOLLS, PARKING, WASHES | | 44A. $ | |
| | 45. $ | CAR MAINTENANCE, REPAIRS, AND PLATES | 240 | 45A. $ 20 | |
| | | INSURANCE | | | |
| | 46. $ | HEALTH INSURANCE (MAKE NO ENTRY IF THE PREMIUM IS PAID THROUGH WORK) | | 46A. $ | (133) |
| | 47. $ | AUTOMOBILE INSURANCE | 1,600 | 47A. $ 133 | |
| | 48. $ | UMBRELLA LIABILITY INSURANCE, PERSONAL IDENTITY INSURANCE | | 48A. $ | |
| | 49. $ | BOAT AND PERSONAL ARTICLES INSURANCE | | 49A. $ | |
| | 50. $ | PROFESSIONAL LIABILITY INSURANCE | | 50A. $ | |
| | | LOANS, IRS, STATE INCOME TAX | | | |
| (0) | 51. $ | STUDENT LOAN(S) | | 51A. $ | |
| | 52. $ | HOME EQUITY LOAN OR LINE OF CREDIT | | 52A. $ | |
| | 53. $ 0 | PERSONAL LOANS (PAID TO A BANK OR PERSON) 401(K) LOAN | | 53A. $ | |
| | 54. $ 0 | CREDIT CARDS (MAKE NO ENTRY IF YOU PAY THE BALANCE IN FULL EACH MONTH) | | 54A. $ | |
| | 55. $ | PAYMENTS TO THE IRS | | 55A. $ | |
| | 56. $ | PAYMENTS TO STATE INCOME TAX | | 56A. $ | |
| | | MISCELLANEOUS | | | |
| (10) | 57. $ | SPOUSAL/CHILD SUPPORT | | 57A. $ | (175) |
| | 58. $ | CHILD CARE | | 58A. $ | |
| | 59. $ | BABYSITTING | | 59A. $ | |
| | 60. $ | TAX PREPARATION | 240 | 60A. $ 20 | |
| | 61. $ | LEGAL FEES | | 61A. $ | |
| | 62. $ | PROFESSIONAL LICENSE FEES | 60 | 62A. $ 5 | |
| | 63. $ 10 | NEWSPAPERS & MAGAZINES | | 63A. $ | |
| | 64. $ | MULTI-LEVEL MARKETING (MLM) MEETINGS, TAPES | 1800 | 64A. $ 150 | |
| | 65. $ | | | 65A. $ | |
| | 66. $ | | | 66A. $ | |

WORKSHEET C (PART 1) — RUN # 2

1. THESE ITEMS ARE HANDLED BY YOUR CHECKING ACCOUNT AND ALL THE REST BY $AVE TO $PEND

| LINE # | AMOUNT | CATEGORY |
|---|---|---|
| 1 | $ 819 | MORTGAGE |
| 2 | $ 0 | PRE-PAYMENTS |
| 3 | $ 100 | PROPERTY TAXES |
| 4 | $ 200 | SCHOOL TAXES |
| 8 | $ 140 | UTILITY COMPANY |
| 10 | $ 110 | PHONES, ETC. |
| 11 | $ 15 | TRASH |
| 19 | $ 390 | GROCERIES |
| 20 | $ 65 | WORK MEALS |
| 21 | $ 538 | CHURCH |
| 32 | $ 15 | LAUNDRY, DRY CL. |
| 33 | $ 20 | HAIRCUTS |
| 34 | $ 25 | POCKET $ - MA |
| 35 | $ 25 | POCKET $ - PA |
| 36 | $ 100 | RESTAURANTS |
| 40 | $ 0 | CAR LOAN |
| 41 | $ 0 | CAR LOAN |
| 42 | $ 175 | CAR FUEL |
| 44 | $ 10 | TOLLS, PARK, WASHES |
| 53 | $ 0 | 401(K) LOAN |
| 54 | $ 0 | CREDIT CARDS |
| 63 | $ 10 | NEWSPAPERS, MAGS |
| 72 | $ 300 | LONG-TERM SAVINGS |
| 73 | $ 250 | INVESTMENTS |
| 74 | $ 257 | INSURANCE |

TOTAL: $ 3,564

THESE ITEMS OCCUR FREQUENTLY. FOR MOST ITEMS, THE AMOUNTS ARE PREDICTABLE

2. ITEMS HANDLED BY YOUR $AVE TO $PEND ACCOUNT (YOUR RIGHT RECTANGLE)

| LINE # | MONTHLY AMOUNT | ANNUAL AMOUNT | CATEGORY |
|---|---|---|---|
| 67A | $ 175 | $ 2100 | CAR #1 REPLACEMENT |
| 68A | $ 125 | $ 1500 | CAR #2 REPLACEMENT |
| 69A | $ 200 | $ 2400 | VACATIONS |
| 70A | $ 158 | $ 1890 | GIFTS |
| 71A | $ 42 | $ 500 | EMERGENCIES |
| 5A √ | $ 8 | $ 96 | WATER BILL |
| 6A √ | $ 30 | $ 360 | HOME OWNERS POLICY |
| 9A √ | $ 20 | $ 240 | HVAC MAINT. |
| 15A √ | $ 20 | $ 240 | GARDENING |
| 16A √ | $ 25 | $ 300 | SWIMMING POOL |
| 17A √ | $ 42 | $ 500 | HOME MAINT. |
| 22A √ | $ 25 | $ 300 | UNINSURED MEDICAL |
| 25A √ | $ 67 | $ 800 | CLOTHING |
| 27A √ | $ 33 | $ 400 | YMCA |
| 28A √ | $ 50 | $ 600 | SPORTS, PIANO |
| 31A √ | $ 17 | $ 200 | PETS |
| 38A √ | $ 33 | $ 400 | GOLF, CRAFTS |
| 45A √ | $ 20 | $ 240 | CAR MAINT. |
| 47A √ | $ 133 | $ 1600 | CAR INSURANCE |
| 60A √ | $ 20 | $ 240 | TAX PREP. |
| 62A √ | $ 5 | $ 60 | RN FEES |
| 64A √ | $ 150 | $ 1800 | MLM COSTS |
| √ | $ | $ | |
| √ | $ | $ 8,376 | |
| √ | $ | $ | |

Annotations: $ 8,390 ; $ 8,376

MONTHLY TOTAL: $ 1,398     ANNUAL TOTAL: $ 16,766

THESE ITEMS OCCUR LESS FREQUENTLY. FOR SOME ITEMS, THE AMOUNTS ARE UNPREDICTABLE. (WE ESTIMATED THOSE EXPENSES).
GET "SEED MONEY" INTO THIS ACCOUNT AS SOON AS POSSIBLE, SO YOU DON'T HAVE TO PLAY "CATCH UP". ADD MONEY EACH TIME YOU GET PAID.

NOTES ON REAL ESTATE RENTAL INCOME

| | |
|---|---|
| PRINCIPAL $ | # OF UNITS |
| INTEREST $ | # PAYING RENT NOW |
| TAXES $ | TOTAL CURRENT RENTS $ |
| INSURANCE $ | COSTS = $ |
| MAINTENANCE $ | RENTS = $ |
| TOTAL COSTS $ | CASH FLOW (BEFORE DEPRECIATION) $ |

*FIG. 9*

| WORKSHEET C (PART 2) | RUN # 2 |
|---|---|

| 3. | "SEED MONEY" FOR YOUR $AVE TO $PEND ACCOUNT | | |
|---|---|---|---|
| CATEGORY | $ | OF | $ |
| REPLACE CAR #1 | | OF | 2100 |
| REPLACE CAR #2 | | OF | 1500 |
| VACATIONS | 1200 | OF | 2400 |
| GIFTS | 945 | OF | 1890 |
| EMERGENCIES | 250 | OF | 500 |
| WATER BILL | 24 | OF | 96 |
| H.O. POLICY | 150 | OF | 360 |
| HVAC | 120 | OF | 240 |
| GARDEN | 0 | OF | 240 |
| SWIMMING | 0 | OF | 300 |
| HOME MAINT. | 200 | OF | 500 |
| UNINSURED RX | 100 | OF | 300 |
| CLOTHING | 300 | OF | 800 |
| YMCA | 235 | OF | 400 |
| SPORTS, PIANO | 200 | OF | 600 |
| PETS | 75 | OF | 200 |
| GOLF, CRAFTS | 300 | OF | 400 |
| CAR MAINT. | 50 | OF | 240 |
| CAR INSURANCE | 1068 | OF | 1600 |
| TAX PREP | 40 | OF | 240 |
| RN FEES | 0 | OF | 60 |
| MLM | 900 | OF | 1800 |
| TOTAL: | $ 6,157 | | |

GET THIS AMOUNT AS QUICKLY AS POSSIBLE INTO YOUR $AVE TO $PEND ACCOUNT.

| 4. | CALENDAR OF PREDICTABLE WITHDRAWALS (TRANSFER MONEY OUT OF $AVE TO $PEND ACCOUNT INTO YOUR REGULAR CHECKING ACCOUNT) |
|---|---|
| JAN | |
| FEB | |
| MAR | |
| APR | |
| MAY | |
| JUN | |
| JUL | $2400 VACATION |
| AUG | |
| SEP | |
| OCT | |
| NOV | |
| DEC | |

| 5. | YOUR $AVE TO $PEND ACCOUNT WILL "PRE-FUND" THESE EXPENSES. THESE FALL DUE AT UNPREDICTABLE TIMES | |
|---|---|---|
| CATEGORY OF EXPENSE | AMOUNT ESTIMATED | |
| EMERGENCIES | $ | 500 |
| HOME MAINT. | $ | 500 |
| UNINSURED MED. | $ | 300 |
| CLOTHING | $ | 800 |
| PETS | $ | 200 |
| CAR MAINT. | $ | 240 |
| TOTAL: | $ | 2,540 |

ALL THESE ARE PART OF YOUR $AVE TO $PEND ACCOUNT. THIS SIMPLE SYSTEM "PRE-FUNDS" EVERY EXPENSE. THERE IS NO NEED TO BE THROWN OFF STRIDE.

| WORKSHEET D | RUN # 2 | YOUR SCORECARD | | | | | RIGHT RECTANGLE $AVE TO $PEND ACCOUNT ANNUAL ALLOCATION | | | | | | | $16,766 |
|---|---|---|---|---|---|---|---|---|---|---|---|---|---|---|
| | | | | | | | ← RED √ ITEMS (TOTALED ON WORKSHEET B & ITEMIZED ON WORKSHEET C) → | | | | | | | |
| CATEGORY | CAR #1 | CAR #2 | VACATION | GIFTS | EMERGEN-CIES | TAXES/HOME UTILITIES | MAINT-ENANCE | HOME IM-PROVEMENT | MEDICAL | CLOTHES/KIDS | CRAFTS & RECREATION | AUTO EXPENSES | INSURANCE | INCOME TAX | CATEGORY |
| ANNUAL | 2,100 | 1,500 | 2,400 | 1,890 | 500 | 96 WATER 360 HO-I 240 HVAC | 240 GARDEN 300 SWIM | 500 | 300 | 800 | 400 GOLF 400 "Y" 600 SPORTS /PIANO 200 PETS | 240 | 1,600 | 240 | 60 RN FEE 1,800 MLM |
| JAN | | | | | | | | | | | | | | | |
| FEB | | | | | | | | | | | | | | | |
| MAR | | | | | | | | | | | | | | | |
| APR | | | | | 200 | | | | | | | | | | |
| MAY | | | | | | | | | | | | | | | |
| JUN | | | | | | | | | | | | | | | |
| JUL | | | | | | | | | | | | | | | |
| AUG | | | | | | | | | | | | 240 | | | |
| SEP | | | | | | | | | | | | | | | |
| OCT | | | | | | | | | | | | | | | |
| NOV | | | | | | | | | | | | | | | |
| DEC | | | | | | | | | | | | | | | |
| TOTAL | | | | | | | | | | | | | | | |

45

CASH FLOW MANAGEMENT SYSTEM

BACKGROUND OF THE INVENTION

1. Technical Field

The present invention relates generally to a cash flow management system, and more particularly to an integrated cash flow management system, method, and associated worksheets.

2. Related Art

Financial planning, savings, investment strategizing, etc. for an individual, family, or business entity often pays inadequate attention to cash flow management, resulting in negative cash flow or other adverse financial parameters. Accordingly, a method and system is needed for assuring a non-negative cash flow in the context of healthy financial parameters.

SUMMARY OF THE INVENTION

In first embodiments, the present invention provides an expense worksheet, comprising a medium having:
- a 3-circles block for listing 3-circles expenses, wherein the 3-circles expenses include alpha expenses;
- a right rectangle block for listing right rectangle expenses, wherein the right rectangle expenses include beta expenses;
- additional expenses blocks for listing additional expenses, wherein the additional expenses include both alpha expenses and beta expenses;
- wherein the alpha expenses and the beta expenses are differentiated by a time interval.

In second embodiments, the present invention provides a money flow worksheet, comprising a medium having:
- a debt workblock;
- a save-to-spend workblock;
- a savings icon;
- an investment icon;
- an insurance icon;
- a first directional flow indicator from the savings icon to the investment icon; and
- a second directional flow indicator from the insurance icon to the investment icon.

In third embodiments, the present invention provides an expense worksheet including a first medium having:
- a 3-circles block for listing 3-circles expenses wherein the 3-circles expenses include alpha expenses,
- a right rectangle block for listing right rectangle expenses wherein the right rectangle expenses include beta expenses,
- additional expenses blocks for listing additional expenses, wherein the additional expenses include both alpha expenses and beta expenses,
- wherein the alpha expenses and the beta expenses are differentiated by a time interval; and a money flow worksheet including a second medium having:
- a debt workblock,
- a save-to-spend workblock,
- a savings icon,
- an investment icon,
- an insurance icon,
- a first directional flow indicator from the savings icon to the investment icon, and
- a second directional flow indicator from the insurance icon to the investment icon.

In fourth embodiments, the present invention provides a method for forming an expense worksheet, said method comprising forming a medium having:
- a 3-circles block for listing 3-circles expenses, wherein the 3-circles expenses include alpha expenses;
- a right rectangle block for listing right rectangle expenses, wherein the right rectangle expenses include beta expenses;
- additional expenses blocks for listing additional expenses, wherein the additional expenses include both alpha expenses and beta expenses;
- wherein the alpha expenses and the beta expenses are differentiated by a time interval.

In fifth embodiments, the present invention provides a method for forming a money flow worksheet, said method comprising forming a medium having:
- a debt workblock;
- a save-to-spend workblock;
- a savings icon;
- an investment icon;
- an insurance icon;
- a first directional flow indicator from the savings icon to the investment icon; and
- a second directional flow indicator from the insurance icon to the investment icon.

In sixth embodiments, the present invention provides a method for forming a worksheet set, said method comprising:

forming an expense worksheet, including forming a first medium having:
- a 3-circles block for listing 3-circles expenses wherein the 3-circles expenses include alpha expenses,
- a right rectangle block for listing right rectangle expenses wherein the right rectangle expenses include beta expenses,
- additional expenses blocks for listing additional expenses, wherein the additional expenses include both alpha expenses and beta expenses,
- wherein the alpha expenses and the beta expenses are differentiated by a time interval; and forming a money flow worksheet, comprising forming a second medium having:
- a debt workblock,
- a save-to-spend workblock,
- a savings icon,
- an investment icon,
- an insurance icon,
- a first directional flow indicator from the savings icon to the investment icon, and
- a second directional flow indicator from the insurance icon to the investment icon.

In seventh embodiments, the present invention provides an integrated cash flow management method, comprising:
- providing a specification of an average income for a time interval;
- delineating alpha expenses and beta expenses for the time interval;
- summing the alpha expenses to calculate a total alpha expense for the time interval;
- summing the beta expenses to calculate a total beta expense for the time interval;
- summing the total alpha expense for the time interval and the total beta expense for the time interval to calculate an average total expense for the time interval; and
- calculating a cash flow for the time interval by subtracting the average total expense for the time interval from the average income for the time interval.

In eighth embodiments, the present invention provides a computer system algorithm for performing integrated cash flow management, said computer system comprising an algorithm adapted to:

access a specification of an average income for a time interval;

access a delineation of alpha expenses and beta expenses for the time interval;

sum the alpha expenses to calculate a total alpha expense for the time interval;

sum the beta expenses to calculate a total beta expense for the time interval;

sum the total alpha expense for the time interval and the total beta expense for the time interval to calculate an average total expense for the time interval; and calculate a cash flow for the time interval by subtracting the average total expense for the time interval from the average income for the time interval.

The present invention advantageously provides a method and system for assuring a non-negative cash flow in the context of healthy financial parameters. In particular, the present invention advantageously provides a method, system, and associated worksheets for Integrated Cash Flow Management (ICMF) that considers all pertinent income and expense variables as being coupled to one another. The present invention may be advantageously utilized by individuals, families, businesses, financial counselors, financial planners, investment advisors, accountants, etc.

BRIEF DESCRIPTION OF THE DRAWINGS

FIG. 1 depicts Worksheet A (Part 1) for Run #1 of a model example, in accordance with embodiments of the present invention.

FIG. 2A-2B depicts Worksheet A (Part 2) for Run #1, in accordance with embodiments of the present invention.

FIG. 4 depicts Worksheet C (Part 1) for Run #1, in accordance with embodiments of the present invention.

FIG. 5 depicts Worksheet C (Part 2) for Run #1, in accordance with embodiments of the present invention.

FIG. 6 depicts Worksheet A (Part 1) for Run #2 of the model example, in accordance with embodiments of the present invention.

FIGS. 7A-7B depicts Worksheet A (Part 2) for Run #2, in accordance with embodiments of the present invention.

FIG. 9 depicts Worksheet C (Part 1) for Run #2, in accordance with embodiments of the present invention.

FIG. 10 depicts Worksheet C (Part 2) for Run #2, in accordance with embodiments of the present invention.

FIG. 11 depicts Worksheet D for Run #2, in accordance with embodiments of the present invention.

DETAILED DESCRIPTION OF THE INVENTION

Figure 3:
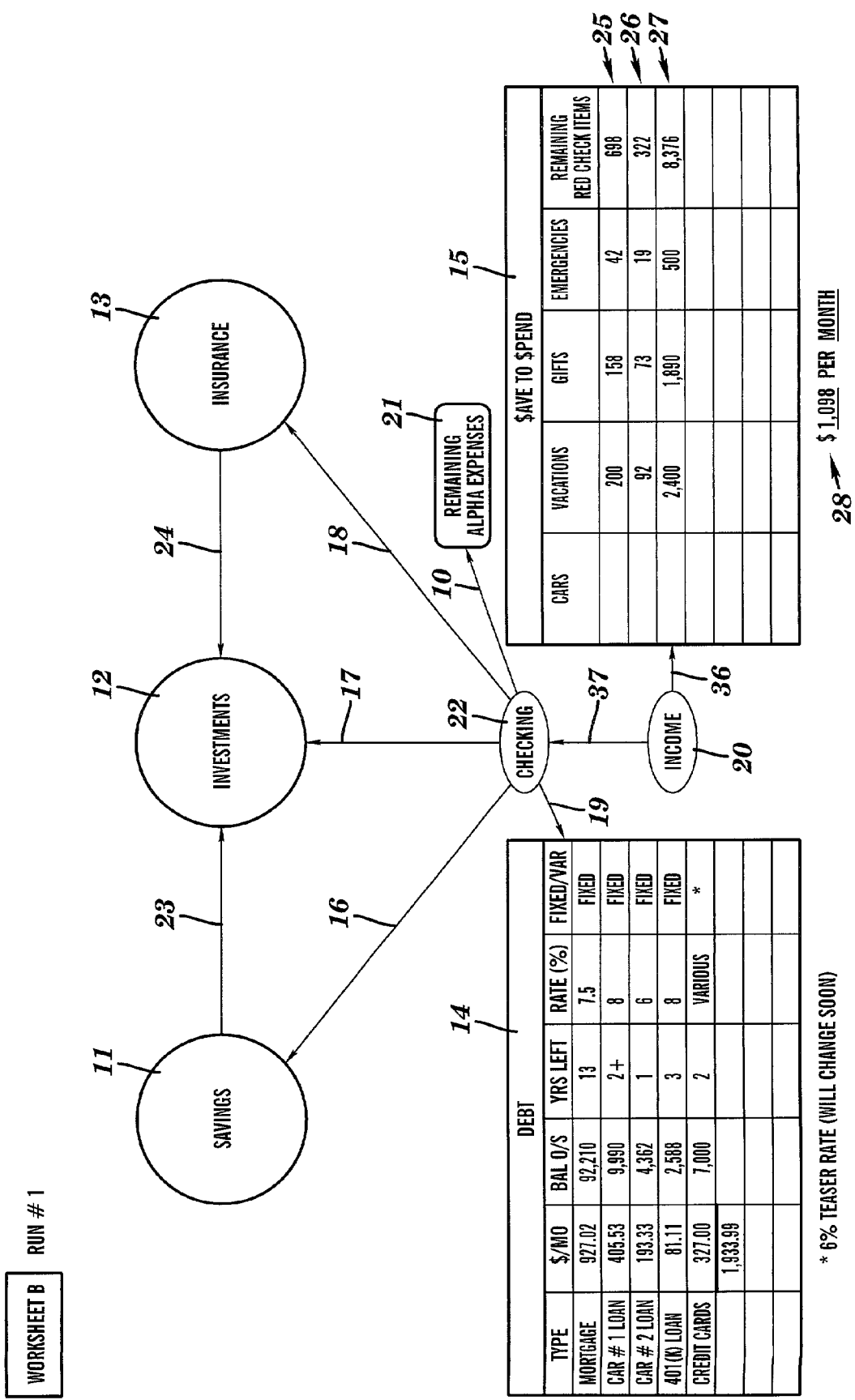
FIG. 3 depicts Worksheet B for Run #1, in accordance with embodiments of the present invention.

Embodiments of the present invention are depicted by the model example of FIGS. 1-11, which illustrates financial characteristics of a family (including cash flow). Run #1 of the model example is described in FIGS. 1-5 and exhibits difficulties in cash flow. Run #2 of the model example is described in FIGS. 6-11 and reflects the use of integrated cash flow management to develop a non-negative cash flow in the context of favorable debt restructuring and favorable savings, investment, and insurance parameters.

Although the family of the model example of FIGS. 1-11 is a fictitious family, this family illustrates problems typically faced by a large number of real families living in the United States and throughout the world. The family is the America family whose members are: Pa America (husband and father, age 46); Ma America (wife and mother, age 36); Suzy America (daughter, age 11); Johnny America (son, age 7); and Billy America (son, age 3). Pa is an engineer working for New York State (NYS) for the past 16 years as an employee for a current annual gross salary of $45,000 per year ($2,544/month takehome). Pa does not view his job with NYS as a career, but would instead like to transition to a self-employment consulting practice with potential gross earnings of $100,000 per year or more. Ma is a registered nurse (RN) who is working on a half-time schedule for an annual gross salary of $19,500 per year ($1,137/month takehome). Ma expects to work full time as an RN in 3 or 4 years when Billy is older. Additionally, Pa and Ma earn an average of $1,200/month (takehome) through their multi-level marketing (MLM) activities. Thus currently, Pa and Ma have a combined takehome income of $4,962 per month (i.e., $2,544 plus $1,137 plus $1,200 plus $81 taken out of Pa's gross income to pay back a 401(k) loan). Ma and Pa anticipate that their children will attend college in the future.

Ma and Pa America own a home having a market value of $150,000 and they have a 15-year mortgage of $92,210. They have about $6,000 in available cash, or cash equivalent, namely nearly $3,000 in their checking and savings accounts and another $3,000 in savings bonds originating as gifts from relatives for the children. Ma and Pa view the $3,000 savings bonds gift money as belonging to the children and "is not to be touched" by Ma and Pa. They have no investments in place with the exception of retirement investments totaling $50,000 ($28,700 NYS deferred compensation+$17,500 from a previous 401(k) plan that has been rolled over into an IRA+$3800 in Roth IRAs). Additionally, Ma and Pa have no hard assets or collectibles of material value except for furniture in their house. Ma and Pa have two cars (Car #1 and Car #2, with both cars still under 3-year/36-month warranty against defects and repairs) which they are currently financing through loans and therefore have little or no equity in the two cars. The two cars will depreciate in value rapidly as the cars age.

Pa has a New York State Retirement System death benefit of $135,000 (i.e., 3×salary from the NYS Retirement System). Additionally, there are privately owned term life policies of $100,000 on each of Ma and Pa at a premium payment of $35/month. Pa has disability income insurance of $1,249/month (taxable) through the NYS Retirement System. Pa has no privately owned disability income insurance and the Ma and Pa America family has no long-term health insurance. Ma's parents are in their 60's (agewise) and are struggling as dairy farmers, while Pa's parents are in their 70's (agewise) and are in poor health. Ma and Pa have a total indebtedness of $116,150, comprising a mortgage debt of $92,210 and $23,940 short-term debt ($14,352 car loans; $2,588 borrowed from their 401(k) equity; and $7,000 credit card loans). Thus Ma and Pa have a net worth of $89,850 (i.e., $150,000 value of house, plus $50,000 value of retirement investments, plus $6,000 cash or cash equivalent, less $116,150 of debt).

Ma and Pa have the following financial goals: pay off the short term debt of $23,940; increase cash flow (i.e., income minus expenses); build an emergency fund; save for opportunities (e.g., business, real estate or stock market opportunities); pay college expenses of the children; establish investment priorities; invest for growth potential; transition by Pa to self-employment; and purchase lake property.

The following significant events may or will happen in the future: change from employee to self-employment by Pa; income increase in 3 to 4 years from now when Ma transitions to fulltime RN employment; college expenses beginning in about 7 years (e.g.. Suzy is currently 11 years old); possibly having to care for elderly parent of Ma and/or Pa.

The preceding list of goals and significant events indicate that there is lot that Ma and Pa wish to accomplish financially. Whether Ma and Pa can realize their goals depends on their cash flow and their accumulation of savings and investments. A negative cash flow will be ascertained infra for Run #1 from FIGS. 1 and 2, which represents Ma and Pa's spending plan before applying Integrated Cash Flow Management (ICFM) as taught by the present invention.

FIGS. 1 and 2A-2B depict Worksheet A, Part 1 and Part 2, respectively, for Run #1, in accordance with embodiments of the present invention. FIGS. 2A-2B collectively is identified herein as "FIG. 2." Worksheet A is an "expense worksheet," as well as a cash flow summary sheet, that summarizes expenses and enables Cash Flow to be computed. Worksheet A can be physically represented as one large sheet, or alternatively as multiple sheets (e.g., the two sheets of FIGS. 1 and 2). Worksheet A is a template of expense activities (or "expense categories"; i.e., Housing, Food, . . . , Miscellaneous, Right Rectangle, 3-Circles) and specific expenses in each expense category. For example, the Housing expense category includes the specific expenses of rent or mortgage, mortgage prepayments of principal, . . . , home maintenance & upkeep, and household items.

The "Right Rectangle" category on Worksheet A includes expenses in a "right rectangle block" 33 on Worksheet A. The "Right Rectangle" category represents a portion of the Save-To-Spend 15 entity shown in Worksheet B of FIGS. 3 and 8, and will be explained infra. For the present time, note that Save-To-Spend 15 represents saving money regularly (e.g., monthly) to accumulate cash that will finance expenses that do not occur regularly or frequently (e.g., buying a new car, going on a vacation, giving gifts, emergencies, etc.).

The "3-Circles" category on Worksheet A includes expenses in a "3-circles block" 34 on Worksheet A. The "3-Circles" category represents the Savings 11, Investment 12, and Insurance 13 entities shown in Worksheet B of FIGS. 3 and 8, and will be explained infra.

Additional expenses in Worksheet A are listed in "additional expenses blocks." Each additional expense block is associated with an expense category other than the expense categories of Right Rectangle and 3-Circles. The additional expenses blocks comprise blocks for each of Housing, Food, . . . , Miscellaneous.

Thus, Worksheet A comprises "expense blocks," including: the "right rectangle block" 33, the "3-circles block" 34, and the "additional expenses blocks.

The expense categories and specific expenses in each category shown on Worksheet A comprise a representative categorization of expenses and any alternative manner of categorization is within the scope of the present invention. As a first example of an alternative categorization, Housing and Food together with Clothing within Personal/Family & Pets may be combined into a single category named "Basic Necessities." As a second example of an alternative categorization, Pocket Money within Personal/Family & Pets may be alternatively placed within Miscellaneous. As a third example of an alternative categorization, Automobile Insurance within Insurance may be alternatively placed within Right Rectangle if insurance expenses are not paid every month or more frequently. As a fourth example of an alternative categorization, Right Rectangle" and 3-Circles may be combined into a single category named "Security."

An expense or "expense item" on Worksheet A denotes the specific expenses appearing on any of Worksheets and is identified by a line number appearing to the left of the expense or by the description of the expense. For example, the expense of Trash Collection may be referred to as expense item 11, or the expense item of Trash Collection. Worksheet A shows expense items 1,2, . . . 74.

The expenses on Worksheet A are also classified as either Alpha expenses or Beta expenses. An Alpha expense is an expense that is paid every month or more frequently and is entered in column 31 of Parts 1 and 2 of Worksheet A. A Beta expense, also called a "Red Check Mark Item" expense, is paid less frequently than every month and is entered in column 32 Parts 1 and 2 of Worksheet A. The values listed in columns 31 and 32 are in units of dollars per month. The month as a time interval that separates Alpha and Beta expenses is merely illustrative, and any other time interval (e.g., week, two-weeks, etc.) could be used as a time interval that differentiates Alpha and Beta expenses. The use of dollars as a unit of currency is merely illustrative, and any other of currency (e.g., franc, lira, pound, penny, nickel., etc.) could be used as a unit of currency for Worksheet A as well as for all other aspects of the present invention including, inter alia, Worksheets B, C, and D which will be described infra. Classification of the expenses on Worksheet A as either Alpha expenses or Beta expenses is merely illustrative of the time-based categorization, and any other time-based categorization of the expenses on Worksheet A is within the scope of the present invention. Another example of a time-based categorization of the expenses on Worksheet A is a Gamma, Delta, Eta categorization, wherein Gamma expenses occur weekly or more frequently than weekly, Delta expenses occur monthly or more frequently than monthly but less frequently than weekly, and Eta expenses occur less frequently than monthly. Also, some expenses may be classified as either Alpha or Beta expenses, depending the frequency of payment. For example, any of the 3-Circles Expenses (e.g., a Roth IRA "Investments" expense) may be an Alpha Expense or a Beta Expense.

As can be seen on FIGS. 1 and 2, examples of Alpha expenses include, inter alia, Property Taxes ($100/month), Trash Collections ($15/month), Haircuts & Hair Care ($20/month), Restaurants ($100/month), Newspapers & Magazines ($10/month), etc. The circled values to the left of each category are shown in column 41 as the total Alpha expense for each category, which is calculated by summing the specific Alpha expenses in each category. For example, the total Alpha expense for Food is $455/month, which is calculated by summing $390 (Basic Monthly Grocery Expense) and $65 (Work-Related Meals Away from Home). The total Alpha expense in consideration of all categories on Parts 1 and 2 of Worksheet A for Run #1 of FIGS. 1 and 2 is $3,957/month, as denoted at the bottom of column 31 of Worksheet A in FIG. 2. As can be seen on FIGS. 1 and 2, examples of Beta expenses include, inter alia, Water & Sewer Bill ($8/month), Clothing ($67/month), Personal Interest and Hobbies ($33/month), Tax Preparation ($20/money), etc. The circled values to the right of each category are shown in column 42 as the total Beta expense for each category, which is calculated by summing the specific Beta expenses in each category. For example, the total Beta expense for Housing is $145/month, which is calculated by summing $8 (Water & Sewer Bill), $30 (Homeowners Insurance), $20 (Heating Oil, . . . ), $20 (Gardening Expenses), $25 (Swimming Pool Expenses), and $42 (Home Maintenance & Upkeep). The total Beta expense in consideration of all categories on Parts 1 and 2 of Worksheet A for Run #1 of FIGS. 1 and 2 is $1,098/month, as denoted at the bottom of column 42 of Worksheet A in FIG. 2. Note that the Beta (i.e., Red Check Mark Item) expenses include: Right Rectangle expenses of $400/month for vacations, gifts, and emergencies; and Remaining Red Mark Check Item expenses (i.e., Remaining Beta Expenses) of $698/month.

Note that some Alpha and Beta expenses appear on Worksheet A in places other than columns 31 and 32. For example, $1200, $2400, $96, and $360 in relation to expense items 3, 4, 5, and 6, respectively, denote annual expense amounts that correspond to the monthly expense amounts of $100, $200, $8, and $30 appearing in columns 31 and 32.

The Total Monthly Expense is the sum of the total Alpha Expense and the total Beta expense. The Cash Flow is the Monthly Income minus the Total Monthly Expense. From the preceding discussion of Worksheet A of FIGS. 1 and 2, the Total Monthly Expense for Run #1 is $5,055/month (i.e., $3,957/month for the total Alpha expense and $1,098/month for the total Beta Expense. As described supra, Pa and Ma have a Monthly Income of $4,962/month. Consequently, the Cash Flow for Run #1 is −$93/month (i.e., $4,962/month minus $5,055/month). Run #1 demonstrates a negative cash flow which is financially undesirable. Even if Ma and Pa increased their monthly income by $93 to exactly balance the Monthly Income against the Total Monthly Expense, however, Worksheet A for Run #1 demonstrates that Ma and Pa will be unable to satisfy their goals as well as be unable to accommodate future predictable events. As a first example, Ma and Pa want to purchase lake property, but are unable to finance the purchase lake property. Moreover, Ma and Pa do not have a long-term savings account for saving money to finance the purchase of lake property in the future. As a second example, Pa would like to transition to self-employment, but has no money to buffer the fluctuations in weekly and monthly income that typically characterizes self-employment, and additionally lacks start-up money to launch self-employment. Moreover, Ma and Pa do not have a long-term savings account for saving money to finance the transition to self-employment in the future. As a third example, Ma and Pa want to help Suzy, Johnny, and Billy with college expenses, but Ma and Pa have no college investment plan in place. As a fourth example, Ma's and Pa's retirement asset accumulation is inadequate, because: they haven't been able to fully fund their IRA accounts, Pa's NYS Retirement System benefits will not generate enough income and said NYS Retirement System benefits will terminate when Pa becomes self-employed, and the NYS deferred compensation is not being funded at an adequate rate and will terminate when Pa becomes self-employed. As a fifth example, Ma's and Pa's parents on both sides are having financial difficulty and Pa's parents are in poor health. Ma and Pa don't have resources to help their parents financially if their parents' financial situation should significantly worsen.

Run #1 also demonstrates other financial inadequacies of Ma's and Pa's finances. As a first example, Ma and Pa have no cash to fully fund Save-To-Spend (e.g., no money is being saved for financing new car purchases in the future). Of the $6,000 in available cash (or cash equivalent), $3,000 cash on hand is for paying bills and the $3,000 in savings bonds is the childrens' money that "is not to be touched" by Ma and Pa. As a second example, emergencies have been handled in the past by loans against Pa's retirement accounts. As a third example, Pa's life insurance at work ($135,000 from 3×salary) is subject to being lost if Pa becomes totally disabled. As a fourth example, the Long Term Disability (LTD) coverage within the NYS Retirement System requires "total disability," and does not cover "partial disability." As a fifth example, Ma and Pa have no permanent cash value life insurance. Having term life insurance only, Ma and Pa have no back-up reserves and, moreover, cannot afford a permanent cash value life insurance program. As a sixth example, Ma and Pa have a poor debt structure which, combined with their lifestyle spending habits, leaves no residual income for saving, investing, and adequate insuring. The poor debt structure includes a low percent return on mortgage pre-payments. As a seventh example, the car maintenance expenses will increase when the 3-year/36-month warranties expire. As an eighth example, Pa is paying $65/month for work meals, which is a luxury and an unnecessary drain on cash flow.

Although Ma and Pa are well educated in their respective fields, neither has learned the fundamentals of money handling and they do not fully understand the time value of money. Their game plan behind Run #1 is based on: Ma plans to resume full-time R.N. employment in 3 or 4 years when Billy is older; Pa has the potential to significantly increase his income once he becomes established in a self-employment consulting practice; and their mortgage will be paid off in 13 years. Ma and Pa erroneously think that increased income will solve their financial problems. However, increased income is not the solution because the increased income will not change Ma's and Pa's weak money-handling habits and will not give Ma and Pa the strong money-handling skills which they will need to handle increased income. As a first example of weak money-handling habits, although Ma and Pa have been married for 13 years, they can't recall the last year that they went a full 12 months without paying interest on credit cards. As a second example of weak money-handling habits, Ma and Pa have always financed car purchases and have never saved to pay cash for purchase of a car. As a third example of weak money-handling habits, Ma and Pa have never had an emergency fund. As a fourth example of weak money-handling habits, Ma and Pa have never had an opportunity fund for accumulating cash for taking advantage of opportunities such as investment opportunities (e.g., buying into a down market). As a fifth example of weak money-handling habits, Ma's and Pa's insurance is inadequate, as explained supra.

Note that FIGS. 1 and 2 show remarks written onto Worksheet A to illustrate that a user of Worksheet A (as well as Worksheets B, C, and D, described infra) may beneficially record such remarks for any purpose. A first example of said remarks are annual values of expenses such as the annual Property Taxes (see line 3 of FIG. 1) of $1200 corresponding to the monthly Property Taxes expense of $100 in column 31. A second example of said remarks is "90/week not sure" adjacent to Basic Monthly Grocery Expense (see line 19).

FIG. 3 depicts Worksheet B for Run #1, in accordance with embodiments of the present invention. Worksheet B is a "money flow worksheet" that describes the flow of money and also describes how cash flow management is accomplished by the present invention. Since Worksheet A is weak for Run #1 as explained supra in conjunction with FIGS. 1 and 2, Worksheet B in FIG. 3 will assist in identifying for Run #1 how cash flow management should be modified in the subsequent formulation of Run #2.

Worksheet B comprises: Savings ("Left Circle") 11, Investment ("Middle Circle") 12, Insurance ("Right Circle") 13, Debt ("Left Rectangle") 14, and Save-To-Spend ("Right Rectangle") 15. Savings 11, Investment 12, and Insurance 13 are collectively categorized as the "3-Circles" category of Worksheet A, discussed supra. Worksheet B may also include an Income 20, Remaining Alpha Expenses 21, and Checking 22. The circular shapes shown on Worksheet B for Savings 11, Investment 12, and Insurance 13 are merely illustrative, and the scope of the present invention includes any desired shapes (e.g., elliptical, square, triangular, etc.) for said Savings 11, Investment 12, and Insurance 13 on Worksheet B. Similarly, the rectangular shapes shown on Worksheet B for Debt 14 and Save-To-Spend 15 are merely illustrative, and the scope of the present invention includes any desired shapes (e.g., square, vertical left and right sides combined with curved upper and lower sides, etc.) for said Debt 14 and Save-To-Spend 15 on Worksheet B. Similarly, the elliptical shapes shown on Worksheet B for Income 20 and Checking 22 are merely illustrative, and the scope of the present invention includes any desired shapes (e.g., circular, square, etc.) for said Income 20 and Checking 22 on Worksheet B. Similarly, the geometrical shape show on Worksheet B for Remaining Alpha Expenses 21 is merely illustrative, and the scope of the present invention includes any desired shape (e.g., circular, square, etc.) for said Remaining Alpha Expenses 21.

The Income 20 is short-term periodic income (e.g., monthly income). Income 20 is represented on Worksheet B as an "income icon."

Checking 22 denotes a checking account or equivalent thereof, i.e., any vehicle having a check-writing capability (or check-writing equivalent capability such as an Internet-based account from which bills could be paid electronically) such that the principal is not materially affected by market fluctuations. Checking 22 may comprise, inter alia, a conventional bank checking account, a money market checking account, a brokerage service checking account, an Internet account as stated supra, etc. The checking account may or may not be interest bearing. Checking 22 is represented on Worksheet B as a "checking icon."

Savings 11 denotes a long-term savings account or an equivalent thereof. The long-term savings account is any capital-preserving savings vehicle such that the principal is not materially affected by market fluctuations. Savings 11 may comprise, inter alia, a conventional bank savings account, a money market certificate, a money market mutual fund, a short-term treasury bill, a United States savings bond, a safety deposit box, a pillow case, a favorite hiding place in a closet or attic, etc., and combinations thereof. Savings 11 may or may not be interest bearing. Savings 11 provides opportunities to fund Investment 12 including, inter alia, providing an opportunity to: buy into a down market, buy into a business at a favorable time, buy into real estate at a favorable market opportunity, etc. Savings 11 also helps to protect investments (e.g., avoiding having to cash an IRA, or borrow against the IRA, in order to pay for a new roof). Savings 11 also provides backup reserves for any purpose such as defending against a liability lawsuit wherein the liability is not covered by insurance. Additionally, Savings 11 adds to a sense of financial security. Savings 11 is represented on Worksheet B as a "savings icon."

Investment 12 includes any investment(s) subject to market risk such as, inter alia, real estate, stocks, bonds, commodities, mutual funds, annuities, funding to launch self employment, self-employment retirement plan, employee retirement plan, 401(k) plan, IRA, hard assets such as collectibles, etc. Some personal assets may be regarded as collectibles (e.g., art, stamps, coins, antiques, etc.) while other personal assets may be ignored (e.g., a watch or ring having sentimental value). It is discretionary as to which personal assets should classified as collectibles. Investment 12 may be funded from at least one of Savings 11, Insurance 13, and Save-To-Spend 15, as will be described infra. Investment 12 is represented on Worksheet B as an "investment icon."

Insurance 13 may include any life insurance, as well as disability insurance and long-term health care insurance. Insurance 13 may incorporate an ability to accumulate cash value, wherein permanent cash value life insurance may provide back-up reserves that makes money available for any purpose such as, inter alia, funding Investments 12, emergencies, etc. Cash value builds up tax-deferred and may be available without triggering taxes. Dividends derived from cash value can be drawn tax free under current tax code regulations. Additionally, cash value can be borrowed against. It is desirable that investments associated with the life insurance be free of market risk. Nonetheless variable life insurance, which has cash value but is pegged to the stock market and is thus subject to market risk, is within the scope of the present invention. The scope of the present invention also includes the case in which Insurance 13 does not include cash value. The scope of the present invention also includes the case in which Insurance 13 is absent. Insurance 13 is represented on Worksheet B as an "insurance icon."

Debt 14 comprises a list of debts. In FIG. 3, the debts for Run #1 (i.e., Mortgage, Car #1 loan, Car #2 loan, 401(k) loan and credit card loan) add up to $1,933.99 per month and respectfully correspond to expense items (i.e., line numbers) 1, 40, 41, 53, and 54 on Worksheet A of FIGS. 1-2. Generally, the debt entries on Debt 14 of Worksheet B also appear on Worksheet A. Debt 14 is represented on Worksheet B as a "debt workblock." Although the debts in Debt 14 are represented in a row format (i.e., the different debts appear in distinct rows), the debts in Debt 14 could alternatively be represented in a column format in which each debt appears in a distinct column.

Save-To-Spend 15 comprises at least one of: a checking account, a money market mutual fund, a savings account, etc., whose purpose is to find expenses that do not occur monthly or more frequently, namely car replacement, vacations, gifts, emergencies, and the Remaining Red Check Mark Items on Worksheet A of FIGS. 1-2 (i.e., those Red Check Mark Items exclusive of car replacement, vacations, gifts, and emergencies). The checking account, money market mutual fund, or savings account of Save-To-Spend 15 may be any type of the checking account (or equivalent) variants described supra for Checking 22, or any of the saving account (or equivalent) variants described supra for Savings 11. Save-To-Spend 15 may be funded at a frequency that corresponds to the pay frequency of Ma and Pa (e.g., monthly, weekly, bi-weekly, etc.). Row 25 of Save-to-Spend 15 of FIG. 3 corresponds to funding Save-to-Spend 15 at a monthly rate. Row 26 of Save-to-Spend 15 of FIG. 3 corresponds to funding Save-to-Spend 15 at a biweekly rate (i.e., every 2 weeks or 26 times/year). Row 27 of Save-to-Spend 15 of FIG. 3 corresponds to funding Save-to-Spend 15 at an annual rate (i.e., once/year). The total 28 Save-to-Spend 15 is $1,098/month (i.e., a summation of $200, $158, $42, and $698). Save-To-Spend 15 is represented on Worksheet B as a "save-to-spend workblock." Although the expenses in Save-to-Spend 15 are represented in a column format (e.g., the expenses of "cars", "vacations", etc. appear in distinct columns in row 25), the expenses in Save-to-Spend 15 could be alternatively represented in a row format in which each expense type (i.e., "cars", "vacations", etc.) appears in a distinct row.

FIG. 3 illustrates aspects of the logic behind the cash flow management system of the present invention. For Run #1, Income 20 is the Monthly Income of $4,962/month, described supra. A first portion 36 of the Income 20 is distributed to Save-To-Spend 15. The first portion 36 is indicated on Worksheet B by a directional flow indicator showing that money flows from Income 20 to Save-To-Spend 15. Although the directional flow indicator associated with the first portion 36 of Income 20 is represented in FIG. 3 by an arrow, in general said directional flow indicator may be represented in Worksheet B in any manner that respectively communicates a flow of money from Income 20 to Save-To-Spend 15. A remaining portion 37 of the Income 20 is distributed to Checking 22. The remaining portion 37 is indicated on Worksheet B by a directional flow indicator showing that money flows from Income 20 to Checking 22. Although the directional flow indicator associated with the remaining portion 37 is represented in FIG. 3 by an arrow, in general said directional flow indicator may be represented in Worksheet B in any manner that respectively communicates a flow of money from Income 20 to Checking 22. Money from Checking 22 is then directed to: payment of Debt 14 (which comprise Alpha expenses), adding to Savings 11, adding to Investments 12, adding to Insurance 13, and payment of Remaining Alpha Expenses 21. The Alpha expenses comprise the sum of the Debt 14 expenses, 3-Circles Expenses (i.e., expenses 72-74 on Worksheet A), and the Remaining Alpha Expenses 21. Thus, the Remaining Alpha Expenses 21 are the Alpha expenses minus the sum of the Debt 14 expenses and the 3-Circles Expenses. The Remaining Alpha Expenses 21 are represented on Worksheet B as a "remaining alpha expenses" icon. Investments 12 may be funded additionally from Savings 11 and cash value from Insurance 13, as respectively shown by directional flow indicators 23 and 24. Although the directional flow indicators 23 and 24 are represented in FIG. 3 by arrows, in general the directional flow indicators 23 and 24 may be represented in Worksheet B in any manner that respectively communicates a flow of money from Savings 11 to Investments 12 and from Insurance 13 to Investments 12.

As stated supra, money is distributed from Checking 22 into: Savings 11 (as shown by directional flow indicator 16), Investments 12 (as shown by directional flow indicator 17), Insurance 13 (as shown by directional flow indicator 18), Debt 14 (as shown by directional flow indicator 19), and Remaining Alpha Expenses 21 (as shown by directional flow indicator 10). Although the directional flow indicators 16, 17, 18, 19, and 10 are represented in FIG. 3 by arrows, in general the directional flow indicators 16, 17, 18, 19, and 10 may be represented in Worksheet B in any manner that communicates the directional of flow of money from Checking 22 to, respectively, Savings 11, Investments 12, Insurance 13, Debt 14, and Remaining Alpha Expenses 21.

For Run #1, the first portion 36 of the Income 20 that is distributed to Save-To-Spend 15 is $1,098, leaving $3,864 (i.e., $4,962 minus $1,098) as the remaining portion 37 of the Income 20. The remaining expenses from Worksheet A of FIGS. 1-2 is $3,957 (i.e., the Total Monthly Expense $5,055 minus the Save-To-Spend 15 amount of $1,098 already distributed). Note that the Total Monthly Expense $5,055 includes the Debt 14 amount of $1,934. Unfortunately, $3,864 minus $3,957 is –$93 representing the negative Cash Flow previously calculated in conjunction with FIGS. 1-2.

Based on the negative Cash Flow for Run #1, there is no residual money available to feed Savings 11, Investments 12, and Insurance 13, which confirms that the distribution of expenses on Worksheet A for Run #1 of FIGS. 1-2 is financially adverse for Ma and Pa. Thus, the current status of Savings 11, Investments 12, and Insurance 13 is as follows. Savings 11 has $6,000 (as explained supra) of which $3,000 are for the children and not to be touched by Ma and Pa. Investments 12 has $200,000; i.e., the $150,000 value of the house plus the $50,000 value of retirement investments. However, Debt 14 shows that there is an outstanding mortgage loan of $92,210 and an outstanding 401(k) loan of $2,588, which reduces the effective value of the Investments 12 to $105,202 (i.e., $200,000 minus $92,210 minus $2,588). Insurance 13 has: term life of $135,000 on Pa from NYS Retirement System which will disappear if Pa becomes totally disabled or if Pa transitions to self-employment; privately owned term life of $100,000 on Ma and Pa; disability insurance from NYS Retirement System which requires "total disability," is taxable to Pa, and will disappear if Pa transitions to self-employment. Insurance 13 does not include private disability insurance, and there is no long-term health care insurance in place. In summary, Savings 11, Investments 12, and Insurance 13 are in bad shape and are not going to get better unless Ma and Pa make significant changes such as in their cash flow management. Run #2, discussed infra, will illustrate how integrated cash flow management will solve Ma's and Pa's financial problems and help Savings 11, Investments 12, and Insurance 13 to be launched and to grow.

FIGS. 4 and 5 show Part 1 and Part 2, respectively, of Worksheet C for Run #1, in accordance with embodiments of the present invention. Worksheet C is an "expense analysis worksheet" that lists: alpha expenses together, beta expenses together, seed money, and pre-funded expenses. Worksheet C facilitates the calculation of Cash Flow. Worksheet C has the following boxes: Boxes 1 and 2 on Part 1, and Boxes 3, 4, and 5 on Part 2. Box 1 is an "alpha workblock" that lists the Alpha expenses and the total Alpha expense ($3,957/month for Run #1) of Worksheet A, which are handled by Checking 22 of Worksheet B. Box 1 does not include any beta expense. Box 2 is a "beta workblock" that lists the Beta expenses and the total Beta expense ($1,098/month for Run #1) of Worksheet A, which are handled by Save-To-Spend 15 of Worksheet B. Box 2 does not include any alpha expense.

Under Box 2 is a "Notes on Real Estate Rental Income" box for keeping track of income, expenses, and cash flow associated with real estate investments that generate income.

Box 3 is a "seed money workblock" that lists "Seed Money" needed to initiate Save-To-Spend 15 of Worksheet B, in recognition of the fact that the activities funded by Save-To-Spend 15 may be time sensitive. The following examples assume that Save-To-Spend 15 is initiated during the month of December of a given year. As a first example, since vacation money is being accumulated in Save-To-Spend 15 at the rate of $200/month and if a vacation during July of the next year requires $2,400, then $1,200 of seed money is to be inserted into Save-To-Spend 15 during December of the given year. As a second example, if emergencies are estimated to require $500/year, then some seed money (e.g., $250 which is 50% of the estimated annual amount) is needed in Save-To-Spend 15 in December of the given year, since the timing of emergencies is unpredictable and an emergency could occur the day after Save-To-Spend 15 is initiated. The Box 3 total is $6,157. For Run #1, Box 3 cannot be funded because the $6,157 is unavailable.

Box 4 is a "predictable withdrawals workblock" that enables Ma and Pa to make a calendar of their predictable withdrawals from their Save-To-Spend 15 account to pay the expenses of Box 2 of Worksheet C. For example, if Ma and Pa expect to take vacation during July, then "$2400 vacation" should be written next to "JULY" in Box 4.

Box 5 is a "pre-funding workblock" that lists amounts to pre-fund in total, in Save-To-Spend 15, those expenses that occur at unpredictable times. For example, the estimated $500 of annual emergency money would be initially placed in Save-To-Spend 15. A purpose of Box 5 is to provide an indication of the magnitude of the unpredictable expenses associate with Save-To-Spend 15.

The preceding discussion and analysis of Run #1 will now be utilized to formulate Run #2, which adjusts Ma's and Pa's spending plan so as to have zero Cash Flow and to populate and grow Savings 11, Investments 12, and Insurance 13 of Worksheet B. A sensible restructuring of debt will be an important weapon, and Save-To-Spend 15 of Worksheet B will serve as a catalyst for making the resulting integrated cash flow management plan practical and easy to implement.

In deriving Run #2, the highlighted expense items 1, 2, 40, 41, 53, and 54 of Parts 1 and 2 of Worksheet A for Run #1, as shown in FIGS. 1-2, will be adjusted. For expense item 1, the 15-year $92,210 mortgage @ 7¼%/year interest will be converted to a 30-year $120,000 mortgage @ 7½%/year interest, which is used to pay off the debts associated with expense items 40, 41, 53, and 54, as well as reducing the monthly mortgage payment from $927 to $819. Additionally, the mortgage prepayment of $50/month of expense item 2 will be eliminated. It makes no sense to reduce or hasten the payment of the mortgage, since the effective rate of return on investment after taxes is rather low. In particular, if Ma and Pa are in a 33% income tax bracket, then the effective rate of return on investment after taxes is only 5% (i.e., 7½% minus ⅓ of 7½%). Pa could also have eliminated the expense item 20 of $65/month for work meals, as explained supra, but opted instead to eat lunch at restaurants, in spite of his inability to achieve his financial objectives. Next, the discussion shall focus Run #2, which is characterized by FIGS. 6-11.

Figure 7B:
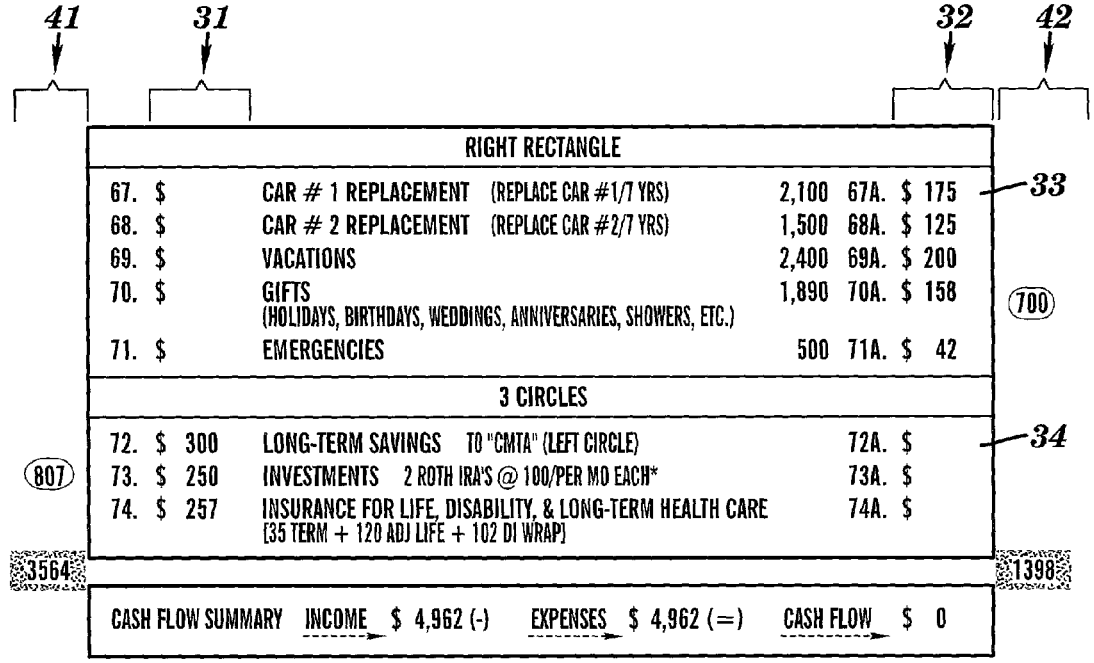

FIGS. 6 and 7A-7B depict Worksheet A, Part 1 and Part 2, respectively, for Run #2, in accordance with embodiments of the present invention. FIGS. 7A-7B collectively is identified herein as "FIG. 7." FIGS. 6 and 7 are the same as FIGS. 1 and 2, described supra, with the following exceptions. A first exception is the modification of expense items 1, 2, 40, 41, 53, and 54 noted supra. A second exception is addition of monthly expenses of $300, $250, and $257 to populate and grow Savings 11, Investments 12, and Insurance 13, respectively, of Worksheet B (i.e., expense items 72, 73, and 74 in "3-Circles"). A third exception is addition of monthly expenses of $175 and $125 to save for new/used replacement cars for Car #1 and Car #2 (i.e., expense items 67 and 68 in "Right-Rectangle"). The first exception made the second and third exceptions possible. In addition to modifying the spending plan of Worksheet A, Run #2 has utilized a first portion of the $6,000 to initially fund the Save-To-Spend 15 while leaving a remaining portion of the $6,000 in Checking 22 for operating cash.

In FIGS. 6 and 7, the total Alpha expense in consideration of all categories on Parts 1 and 2 of Worksheet A for Run #2 is $3,564/month as shown. Also in FIGS. 6 and 7, the total Beta expense in consideration of all categories on Parts 1 and 2 of Worksheet A for Run #2 is $1,398/month as shown. Thus the total monthly expense for Run #2 is $4,962 (i.e., $3,564 plus $1,398). Since that the Monthly Income of Ma and Pa is $4,962, as explained supra, the Cash Flow for Run #1 is $0/month (i.e., $4,962/month Monthly Income minus $4,962/month Monthly Expense). Thus, the following accomplishments have been achieved: zero Cash Flow, and population and growth of Savings 11, Investments 12, and Insurance 13. Additionally, Ma and Pa will now have an increased potential, over time, to accomplish their goals (e.g., save for purchase of replacement cars, transition to self-employment by Pa, purchase lake property, help the children with college expenses, help to for elderly parents of Ma and/or Pa, etc). Most of the preceding goals will not be immediately accomplished, since several years will be required for the capital in Savings 11, Investments 12, and Insurance 13 to grow to the amounts required or desired by Ma and Pa. What is important is that a good plan is now in place.

Figure 8:
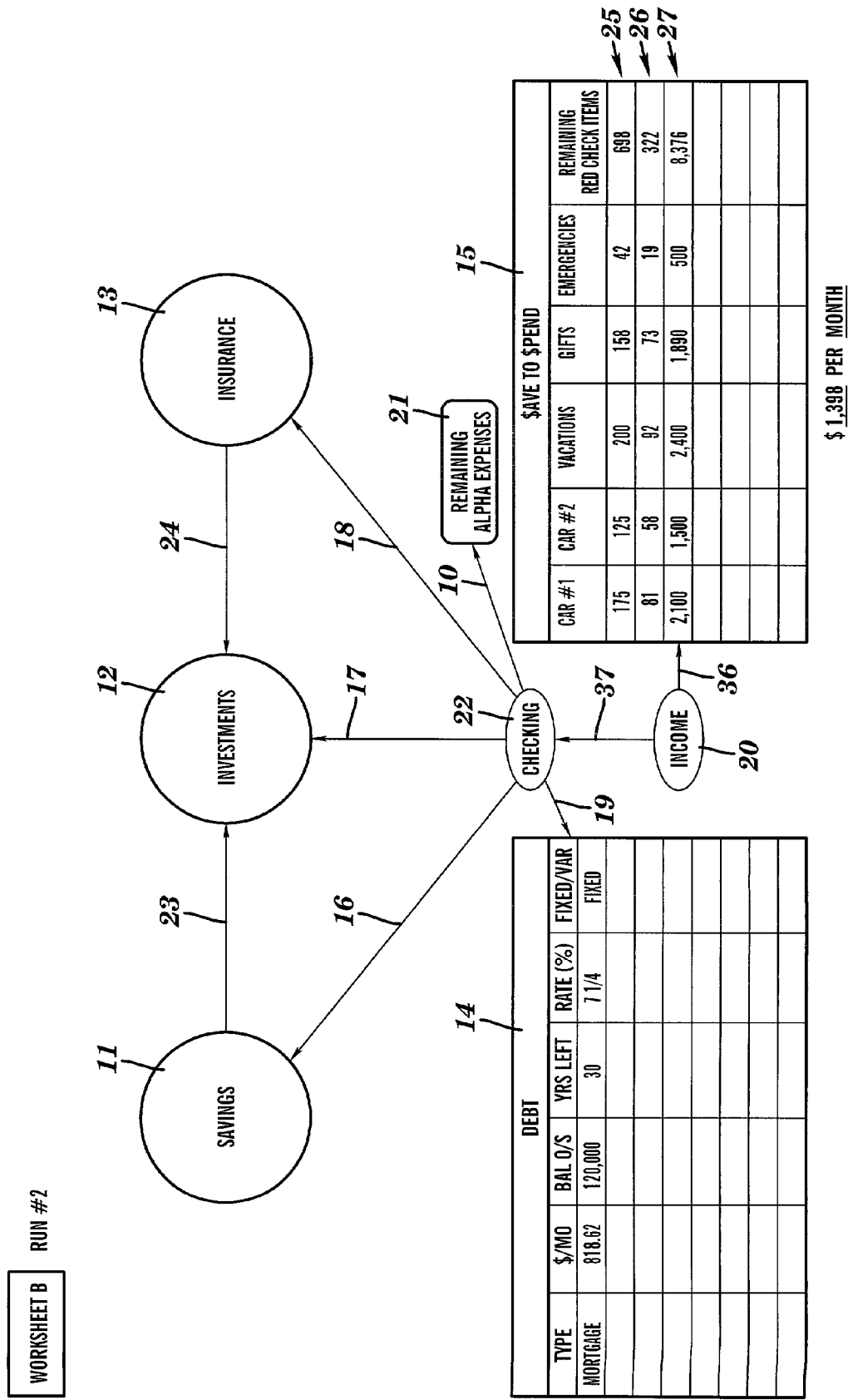
FIG. 8 depicts Worksheet B for Run #2, in accordance with embodiments of the present invention.

FIG. 8 depicts Worksheet B for Run #2, in accordance with embodiments of the present invention. In FIG. 8, Savings 11 is using a money market savings account as its long-term savings account. Investments 12 will be enriched as money flows directly from Checking 22 (i.e., $250/month as shown in expense item 73 of FIG. 7) and subsequently from Savings 11. Insurance 13 may include permanent cash value life insurance, and under certain circumstances, such permanent cash value life insurance could serve as opportunity money in conjunction with Investments 12. Debt 14 of FIG. 8 shows that the only remaining debt is the mortgage at an effective after-tax interest rate of only 5% per year as explained supra. Save-To-spend 15 in FIG. 8 lists monthly expenses for subsequent replacement of Car #1, subsequent replacement of Car #2, vacations, gifts, emergencies, and Remaining Red Check Mark Items. Note that the Beta or Red Check Mark Item expenses of FIGS. 6-7 include: Right Rectangle expenses of $700/month for Car #1, Car #2, vacations, gifts, and emergencies; and Remaining Red Check Mark Item expenses of $698/month.

FIGS. 9 and 10 show Part 1 and Part 2, respectively, of Worksheet C for Run #2, in accordance with embodiments of the present invention. As stated supra in conjunction with FIGS. 4-5, Worksheet C presents, in reorganized form, the expenses listed on Worksheet A. Worksheet C for Run #2 (i.e., FIGS. 9-10) is the same as Worksheet C for Run #1 (i.e., FIGS. 4-5), except for the changes to Worksheet A discussed supra in conjunction with FIGS. 6-7.

Worksheet C of FIGS. 9-10 relates to the expense flow of FIG. 8 as follows. Referring also to Worksheet B of FIG. 8, each month, Ma and Pa receives Income 20 of $4,962 as indicted supra. Of said $4,962, a first portion 36 of $1,398 of the Income 20 is used to pay Spend-To-Save 15. The $1,398 is also shown in Block 2 of FIG. 9. The remaining portion 37 of $3,564 (i.e., $4,962−$1,398) is distributed from Income 20 to Checking 22. The $3,564 is then distributed from Checking 22 into: Savings 11, Investments 12, Insurance 13, Debt 14, and Remaining Alpha Expenses 21.

FIG. 11 is a "scorecard worksheet" that illustrates Worksheet D for Run #2, in accordance with embodiments of the present invention. Row 45 of Worksheet D includes the contents of row 27 of Save-To-Spend 15 of FIG. 8, with the Remaining Red Check Mark Items on row 27 of Save-To-Spend 15 of FIG. 8 being listed in detail on row 45 of Worksheet D. Such Remaining Red Check Mark Items (i.e., Taxes/Home Utilities, Maintenance, . . . , R.N. Fee, MLM) correspond to expense items ($96, $360, $240, $240, $300, . . . , $60, $1800) in Block 2 of Worksheet C of FIG. 9. The scorecard worksheet facilitates staying within self-imposed annual expense limits.

Worksheet D records withdrawals from the Save-To-Spend 15 of FIG. 8 as such withdrawals are made. As an example, FIG. 11 shows entry of $440 of withdrawals for auto expenses in the month of April, namely $240 for planned auto expenses and another $200 for unplanned auto expenses due to emergencies.

Figure 12:
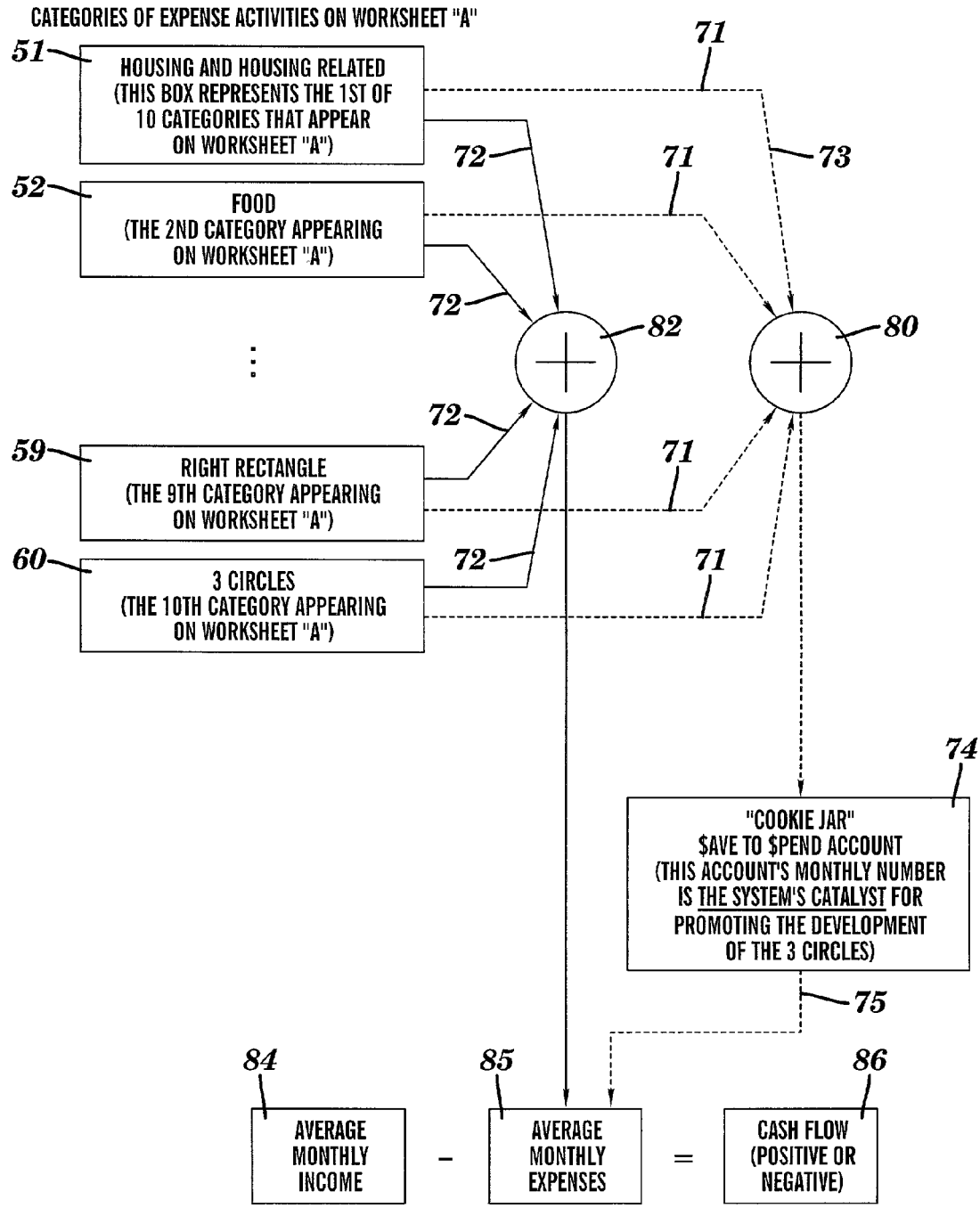
FIG. 12 depicts a flow chart of an Integrated Cash Flow Management (ICFM) system, in accordance with embodiments of the present invention.

FIG. 12 depicts a flow chart of an integrated cash flow management system (ICFM), in accordance with embodiments of the present invention. FIG. 12 shows the categories of expenses activities (or expense categories) shown in Worksheet A (see FIGS. 1-2 and FIGS. 6-7), namely the expense categories of Housing & Housing Related 51, Food 52, ..., Right Rectangle 59, 3-Circles 60. The lines 71 in FIG. 12 represent the monthly alpha expenses of Worksheet A or C, wherein said monthly alpha expenses are summed by summer 82 to calculate the total monthly alpha expense. Referring also to Worksheet B of FIG. 3 or 8, the calculated total monthly alpha expense identifies the remaining portion 37 of the income 20 that is distributed to Checking 22. The lines 72 in FIG. 12 represent the represent the monthly beta expenses of Worksheet A or C, wherein said monthly beta expenses are summed by summer 82 to calculate the total monthly beta expense. Referring again to Worksheet B of FIG. 3 or 8, the calculated total monthly beta expense identifies the first portion 36 of the income 20 that is distributed to Save-To-Spend 15. In FIG. 12, the calculated total monthly beta expense is shown by directional lines 73 and 75 to respectively identify an amount of money to be added to a "cookie jar" 74 and to contribute to an Average Monthly Expenses 85. The cookie jar 74 is a Save-To-Spend Account. The Average Monthly Expenses 85 is calculated as the sum of the total monthly alpha expense and the total monthly beta expense. The monthly Cash Flow 86, which may be positive or negative, is calculated as the difference between the Average Monthly Income 84 and the Average Monthly Expenses 85.

While FIG. 12 expressed the ICFM system in terms of a monthly time interval, the ICFM system may be alternatively expressed in terms of any other time interval (e.g., a weekly time interval, a biweekly time interval, etc.). Thus in FIG. 12, the Average Monthly Income 84 embodies, using a monthly time interval, an average income for the time interval. Similarly, the Average Monthly Expenses 85 embodies, using a monthly time interval, an average total expense for the time interval. Likewise, the monthly Cash Flow 86 embodies, using a monthly time interval, a cash flow for the time interval.

The flow chart of FIG. 12, and the supporting descriptions presented supra in conjunction with FIGS. 1-11, may be implemented in software as Integrated Cash Flow Management (ICFM) software. The ICFM software may be used on stand-alone computer systems, on computers or terminals coupled to servers, by nodes of the Internet in communication with one or more special Internet nodes which execute the ICFM software, etc.

Figure 13:
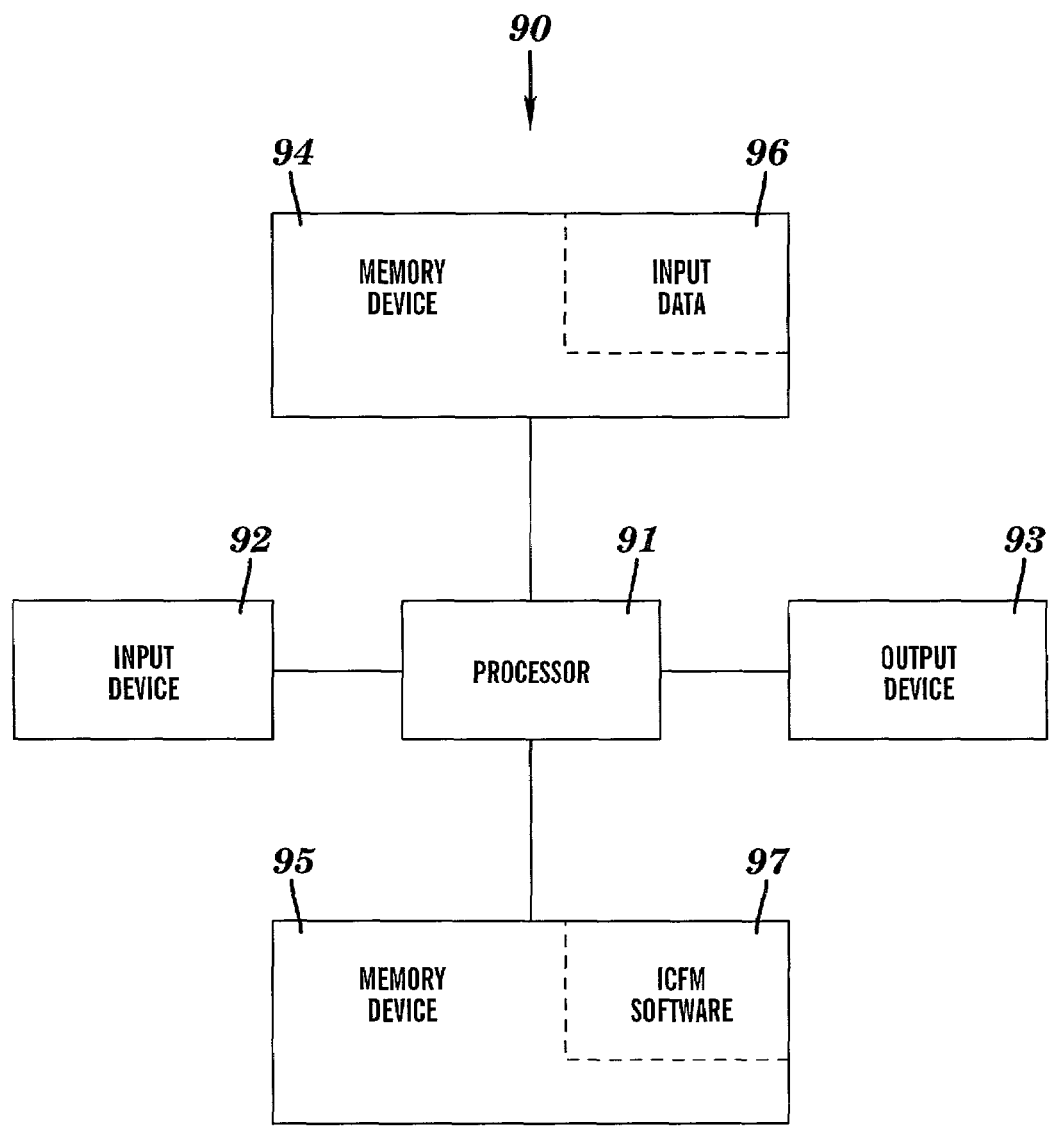
FIG. 13 depicts a computer system for executing Integrated Cash Flow Management (ICFM) software, in accordance with embodiments of the present invention.

FIG. 13 illustrates a computer system 90 for executing the ICFM software 97, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a dynamic random access memory (DRAM), a read-only memory (ROM), etc. The memory device 95 includes the ICFM software 97. The processor 91 executes the ICFM software 97. The memory device 94 includes input data 96. The input data 96 includes input required by the ICFM software 97. The output device 93 displays output from the ICFM software 97. In particular, the output device 93 includes the output medium and displays the output structure of the present invention on the output medium.

While FIG. 13 shows the computer system 90 as a particular configuration of hardware and software, any configuration of hardware and software, as would be known to a person of ordinary skill in the art, may be utilized for the purposes stated supra in conjunction with the particular computer system 90 of FIG. 13. For example, the memory devices 94 and 95 may be portions of a single memory device rather than separate memory devices.

Worksheets A, B, C, and D of the present invention may each be formed and represented on any medium. Such a medium may include, inter alia, a sheet of paper, a computer screen, an electronic medium, a transparency that may be displayed on a surface by a projector, a flat or curved surface (e.g., a wall, a floor, a portable surface) made of a material (e.g., wood, plastic, metal), etc. Thus, Worksheets A, B, C, and D each comprise a medium and entities formed on the medium. Examples of such entities include, inter alia, blocks, workblocks, expense items, etc., as described supra for each of Worksheets A, B, C, and D.

Worksheets A, B, C, and D exist prior to entry of application-dependent information such as, inter alia, numerical values of alpha and beta expenses of Worksheet A. Such application-dependent information on a worksheet represents entries onto the worksheet but is not part of the worksheet. For example, Part 1 of Worksheet A on FIG. 1 exists prior to entry of $15 for the Trash Collections of item 11. The $15 for the Trash Collections in FIG. 1 is not part of Worksheet A but rather is an entry onto Worksheet A.

Worksheets A an B collectively constitute a "worksheet set." This worksheet set may also include Worksheet C, Worksheet D, or Worksheets C and D.

The preceding description of the present invention shows that the present invention relates to an integrated cash flow management system that considers all pertinent income and expense variables as being coupled to one another. The present invention may be used by individuals and businesses to manage their cash flow. The present invention may also be used by financial counselors, financial planners, accountants, investment advisors, etc. to help their clients manage cash flow in personal finances and in business finances. The Worksheets A, B, C, and D of the present invention could also be used to teach individuals, businesses, financial counselors, financial planners, accountants, investment advisors, etc. integrated cash flow management. Thus, the present invention has educational value.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

I claim:

1. An integrated cash flow management method, said method comprising executing an algorithm on a processor of a computer, wherein the algorithm is stored as software on a computer readable storage medium of the computer system, and wherein said executing the algorithm comprises:

specifying an average income for a time interval;

obtaining alpha expenses and beta expenses from an expense data structure consisting of an expense worksheet stored on an electronic medium that is computer readable and is in the computer system, wherein the alpha expenses and the beta expenses are differentiated by the time interval such that the alpha expenses are paid periodically in accordance with a time period not exceeding the time interval and the beta expenses are paid periodically in accordance with a time period exceeding the time interval, wherein the expense worksheet includes distinct blocks of data comprising a 3-circles block listing 3-circles expenses, a right rectangle block listing right rectangle expenses, and additional expenses blocks collectively listing additional alpha expenses and additional beta expenses, wherein the 3-circles expenses are alpha expenses comprising at least one long-term savings expense, at least one investment expense, and at least one insurance expense, wherein the right rectangle expenses are beta expenses comprising at least one expense selected from the group consisting of an expense for replacement of at least one car, an expense for vacations, an expense for gifts, an expense for emergencies, and combinations thereof;

summing the 3-circles expenses and the additional alpha expenses to calculate a total alpha expense for the time interval;

summing the right rectangle expenses and the additional beta expenses to calculate a total beta expense for the time interval;

dividing a sum of the total alpha expense for the time interval and the total beta expense for the time interval by the time interval to calculate an average total expense for the time interval;

computing a cash flow for the time interval by subtracting the average total expense for the time interval from the average income for the time interval, wherein the computed cash flow is a negative cash flow or a non-negative cash flow; and transmitting the computed cash flow to an output device of the computer system.

2. The method of claim 1, wherein the method further comprises determining a flow of money for the time interval, said determining the money flow comprising:

obtaining save-to-spend expenses from a money flow data structure, said money flow data structure being a money flow worksheet stored in the electronic medium, wherein the save-to-spend expenses in the money flow worksheet are the right rectangle expenses in the expense worksheet;

determining a first portion of the average income for the time interval as a money flow that finances the save-to-spend expenses;

determining a remaining portion of the average income for the time interval as a money flow into a checking account or an equivalent thereof, wherein the remaining portion of the average income for the time interval is equal to a difference between the average income for the time interval and the first portion of the average income for the time interval;

determining a first portion of the money flow into the checking account as a first money flow from the checking account or an equivalent thereof that finances debt expenses;

determining a second portion of the money flow into the checking account as a second money flow from the checking account or an equivalent thereof that finances the at least one long-term savings expense;

determining a third portion of the money flow into the checking account as a third money flow from the checking account or an equivalent thereof that finances the at least one investment expense;

determining a fourth portion of the money flow into the checking account as a fourth money flow from the checking account or an equivalent thereof that finances the at least one insurance expense; and determining a fifth portion of the money flow into the checking account as a fifth money flow from the checking account or an equivalent thereof that finances the additional alpha expenses.

3. The method of claim 2, wherein said determining the first portion of the average income for the time interval, said determining the remaining portion of the average income for the time interval, said determining the first portion of the money flow from the checking account or an equivalent thereof, said determining the second portion of the money flow from the checking account or an equivalent thereof, said determining the third portion of the money flow from the checking account or an equivalent thereof, said determining the fourth portion of the money flow from the checking account or an equivalent thereof, and said determining the fifth portion of the money flow from the checking account or an equivalent thereof comprises using content in the money flow worksheet, wherein the content in the money flow worksheet comprises:

a debt workblock comprising the debt expenses;

a save-to-spend workblock comprising the save-to-spend expenses, wherein the save-to-spend workblock and the debt workblock are distinct from each other in the money flow worksheet;

a savings icon denoting a long-term savings account or an equivalent thereof configured to accumulate long-term savings that finances the at least one long-term savings expense;

an investment icon denoting at least one investment subject to market risk and configured to finance the at least one investment expense;

an insurance icon denoting at least one insurance expense selected from the group consisting of an expense for life insurance, an expense for disability insurance, an expense for long-term health insurance, and combinations thereof;

an income icon denoting the average income for the time interval;

a checking icon denoting the checking account or an equivalent thereof;

an additional alpha expenses icon denoting the additional alpha expenses;

a directional flow indicator directed from the income icon to the save-to-spend workblock, denoting that the first portion of the average income for the time interval is directed to the save-to-spend workblock;

a directional flow indicator directed from the income icon to the checking icon, denoting that the remaining portion of the average income for the time interval is directed to the checking account or an equivalent thereof;

a directional flow indicator directed from the checking icon to the debt workblock, denoting the first portion of the money flow from the checking account or an equivalent thereof;

a directional flow indicator directed from the checking icon to the savings icon, denoting the second portion of the money flow from the checking account or an equivalent thereof;

a directional flow indicator directed from the checking icon to the investment icon, denoting the third portion of the money flow from the checking account or an equivalent thereof;

a directional flow indicator directed from the checking icon to the insurance icon, denoting the fourth portion of the money flow from the checking account or an equivalent thereof; and a directional flow indicator directed from the checking icon to the additional alpha expenses icon, denoting the fifth portion of the money flow from the checking account or an equivalent thereof.

4. The method of claim 3, wherein the method further comprises:
displaying the money flow worksheet on a computer screen of the computer system.

5. The method of claim 2, wherein the method further comprises:
adding the first portion of the average income for the time interval to at least one save-to-spend savings vehicle;
adding the remaining portion of the average income for the time interval to the checking account or an equivalent thereof;
funding the debt expenses with the first portion of the money flow from the checking account or an equivalent thereof;
funding the at least one long-term savings expense with the second portion of the money flow from the checking account or an equivalent thereof;
funding the at least one investment expense with the third portion of the money flow from the checking account or an equivalent thereof;
funding the at least one insurance expense with the fourth portion of the money flow from the checking account or an equivalent thereof; and
funding the additional alpha expenses with the fifth portion of the money flow from the checking account or an equivalent thereof.

6. The method of claim 5,
wherein said funding the at least one long-term savings expense comprises directing the second portion of the money flow from the checking account or an equivalent thereof to a long-term savings account or an equivalent thereof selected from the group consisting of a conventional bank savings account, a money market certificate, a money market mutual fund, a short-term treasury bill, a United States savings bond, and combinations thereof,
wherein said funding the at least investment expense comprises directing the third portion of the money flow from the checking account or an equivalent thereof to at least one investment subject to market risk selected from the group consisting of real estate, stocks, bonds, commodities, mutual funds, annuities, a self-employment retirement plan, a employee retirement plan, a 401(k) plan, an IRA, hard assets, and combinations thereof,
wherein said funding the at least investment expense comprises directing the fourth portion of the money flow from the checking account or an equivalent thereof to at least one insurance selected from the group consisting of life insurance, disability insurance, long-term health care insurance, and combinations thereof.

7. The method of claim 2, wherein the checking account or an equivalent thereof is selected from the group consisting of a conventional bank checking account, a money market checking account, a brokerage service checking account, and an Internet account.

8. The method of claim 2, wherein the at least one save-to-spend savings vehicle is selected from the group consisting of a save-to-spend checking account, at least one money market mutual fund, a save-to-spend savings account, and combinations thereof.

9. The method of claim 1, wherein the method further comprises:
displaying the expense worksheet on a computer screen of the computer system.

10. The method of claim 1,
wherein the 3-circles expenses consist of the at least one long-term savings expense, the at least one investment expense, and the at least one insurance expense, and
wherein the right rectangle expenses consist of the expense for replacement of at least one car, the expense for vacations, the expense for gifts, and the expense for emergencies.

11. An integrated cash flow management process, said process comprising:
performing the method of claim 1 resulting in the computed cash flow being said negative cash flow;
responsive to said computed negative cash flow, restructuring the alpha expenses and the beta expenses in the expense worksheet; and
after said restructuring, performing the method of claim 1 resulting in the computed cash flow being said non-negative cash flow.

12. An integrated cash flow management system comprising a processor and a computer readable medium coupled to the processor, said computer readable storage medium having an algorithm stored therein as software configured to be executed by the processor to implement an integrated cash flow management method, wherein the method comprises executing the algorithm on the processor, and wherein said executing the algorithm comprises:
specifying an average income for a time interval;
obtaining alpha expenses and beta expenses from an expense data structure consisting of an expense worksheet stored on an electronic medium that is computer readable and is in the computer system, wherein the alpha expenses and the beta expenses are differentiated by the time interval such that the alpha expenses are paid periodically in accordance with a time period not exceeding the time interval and the beta expenses are paid periodically in accordance with a time period exceeding the time interval, wherein the expense worksheet includes distinct blocks of data comprising a 3-circles block listing 3-circles expenses, a right rectangle block listing right rectangle expenses, and additional expenses blocks collectively listing additional alpha expenses and additional beta expenses, wherein the 3-circles expenses are alpha expenses comprising at least one long-term savings expense, at least one investment expense, and at least one insurance expense, wherein the right rectangle expenses are beta expenses comprising at least one expense selected from the group consisting of an expense for replacement of at least one car, an expense for vacations, an expense for gifts, an expense for emergencies, and combinations thereof;
summing the 3-circles expenses and the additional alpha expenses to calculate a total alpha expense for the time interval;
summing the right rectangle expenses and the additional beta expenses to calculate a total beta expense for the time interval;
dividing a sum of the total alpha expense for the time interval and the total beta expense for the time interval by the time interval to calculate an average total expense for the time interval;
computing a cash flow for the time interval by subtracting the average total expense for the time interval from the average income for the time interval, wherein the computed cash flow is a negative cash flow or a non-negative cash flow; and
transmitting the computed cash flow to an output device of the computer system.

13. The system of claim 12, wherein the method further comprises determining a flow of money for the time interval, said determining the money flow comprising:

obtaining save-to-spend expenses from a money flow data structure, said money flow data structure being a money flow worksheet stored in the electronic medium, wherein the save-to-spend expenses in the money flow worksheet are the right rectangle expenses in the expense worksheet;

determining a first portion of the average income for the time interval as a money flow that finances the save-to-spend expenses;

determining a remaining portion of the average income for the time interval as a money flow into a checking account or an equivalent thereof, wherein the remaining portion of the average income for the time interval is equal to a difference between the average income for the time interval and the first portion of the average income for the time interval;

determining a first portion of the money flow into the checking account as a first money flow from the checking account or an equivalent thereof that finances debt expenses;

determining a second portion of the money flow into the checking account as a second money flow from the checking account or an equivalent thereof that finances the at least one long-term savings expense;

determining a third portion of the money flow into the checking account as a third money flow from the checking account or an equivalent thereof that finances the at least one investment expense;

determining a fourth portion of the money flow into the checking account as a fourth money flow from the checking account or an equivalent thereof that finances the at least one insurance expense; and determining a fifth portion of the money flow into the checking account as a fifth money flow from the checking account or an equivalent thereof that finances the additional alpha expenses.

14. The system of claim 13, wherein said determining the first portion of the average income for the time interval, said determining the remaining portion of the average income for the time interval, said determining the first portion of the money flow from the checking account or an equivalent thereof, said determining the second portion of the money flow from the checking account or an equivalent thereof, said determining the third portion of the money flow from the checking account or an equivalent thereof, said determining the fourth portion of the money flow from the checking account or an equivalent thereof, and said determining the fifth portion of the money flow from the checking account or an equivalent thereof comprises using content in the money flow worksheet, wherein the content in the money flow worksheet comprises:

a debt workblock comprising the debt expenses;

a save-to-spend workblock comprising the save-to-spend expenses, wherein the save-to-spend workblock and the debt workblock are distinct from each other in the money flow worksheet;

a savings icon denoting a long-term savings account or an equivalent thereof configured to accumulate long-term savings that finances the at least one long-term savings expense;

an investment icon denoting at least one investment subject to market risk and configured to finance the at least one investment expense;

an insurance icon denoting at least one insurance expense selected from the group consisting of an expense for life insurance, an expense for disability insurance, an expense for long-term health insurance, and combinations thereof;

an income icon denoting the average income for the time interval;

a checking icon denoting the checking account or an equivalent thereof;

an additional alpha expenses icon denoting the additional alpha expenses;

a directional flow indicator directed from the income icon to the save-to-spend workblock, denoting that the first portion of the average income for the time interval is directed to the save-to-spend workblock;

a directional flow indicator directed from the income icon to the checking icon, denoting that the remaining portion of the average income for the time interval is directed to the checking account or an equivalent thereof;

a directional flow indicator directed from the checking icon to the debt workblock, denoting the first portion of the money flow from the checking account or an equivalent thereof;

a directional flow indicator directed from the checking icon to the savings icon, denoting the second portion of the money flow from the checking account or an equivalent thereof;

a directional flow indicator directed from the checking icon to the investment icon, denoting the third portion of the money flow from the checking account or an equivalent thereof;

a directional flow indicator directed from the checking icon to the insurance icon, denoting the fourth portion of the money flow from the checking account or an equivalent thereof; and a directional flow indicator directed from the checking icon to the additional alpha expenses icon, denoting the fifth portion of the money flow from the checking account or an equivalent thereof.

15. The system of claim 14, wherein the method further comprises:

displaying the money flow worksheet on a computer screen of the computer system.

16. The system of claim 13, wherein the method further comprises:

adding the first portion of the average income for the time interval to at least one save-to-spend savings vehicle;

adding the remaining portion of the average income for the time interval to the checking account or an equivalent thereof;

funding the debt expenses with the first portion of the money flow from the checking account or an equivalent thereof;

funding the at least one long-term savings expense with the second portion of the money flow from the checking account or an equivalent thereof;

funding the at least one investment expense with the third portion of the money flow from the checking account or an equivalent thereof;

funding the at least one insurance expense with the fourth portion of the money flow from the checking account or an equivalent thereof; and funding the additional alpha expenses with the fifth portion of the money flow from the checking account or an equivalent thereof.

17. The system of claim 16,
wherein said funding the at least one long-term savings expense comprises directing the second portion of the money flow from the checking account or an equivalent thereof to a long-term savings account or an equivalent thereof selected from the group consisting of a conventional bank savings account, a money market certificate, a money market mutual fund, a short-term treasury bill, a United States savings bond, and combinations thereof;
wherein said funding the at least investment expense comprises directing the third portion of the money flow from the checking account or an equivalent thereof to at least one investment subject to market risk selected from the group consisting of real estate, stocks, bonds, commodities, mutual funds, annuities, a self-employment retirement plan, a employee retirement plan, a 401(k) plan, an IRA, hard assets, and combinations thereof;
wherein said funding the at least investment expense comprises directing the fourth portion of the money flow from the checking account or an equivalent thereof to at least one insurance selected from the group consisting of life insurance, disability insurance, long-term health care insurance, and combinations thereof.

18. The system of claim 13, wherein the checking account or an equivalent thereof is selected from the group consisting of a conventional bank checking account, a money market checking account, a brokerage service checking account, and an Internet account.

19. The system of claim 13, wherein the at least one save-to-spend savings vehicle is selected from the group consisting of a save-to-spend checking account, at least one money market mutual fund, a save-to-spend savings account, and combinations thereof.

20. The system of claim 12, wherein the method further comprises:
displaying the expense worksheet on a computer screen of the computer system.

21. The system of claim 12,
wherein the 3-circles expenses consist of the at least one long-term savings expense, the at least one investment expense, and the at least one insurance expense, and
wherein the right rectangle expenses consist of the expense for replacement of at least one car, the expense for vacations, the expense for gifts, and the expense for emergencies.

22. A computer program product comprising a computer readable storage medium having an algorithm stored therein as software configured to be executed by a processor of a computer system to implement an integrated cash flow management method, wherein the method comprises executing the algorithm on the processor, and wherein said executing the algorithm comprises:
specifying an average income for a time interval;
obtaining alpha expenses and beta expenses from an expense data structure consisting of an expense worksheet stored on an electronic medium that is computer readable and is in the computer system, wherein the alpha expenses and the beta expenses are differentiated by the time interval such that the alpha expenses are paid periodically in accordance with a time period not exceeding the time interval and the beta expenses are paid periodically in accordance with a time period exceeding the time interval, wherein the expense worksheet includes distinct blocks of data comprising a 3-circles block listing 3-circles expenses, a right rectangle block listing right rectangle expenses, and additional expenses blocks collectively listing additional alpha expenses and additional beta expenses, wherein the 3-circles expenses are alpha expenses comprising at least one long-term savings expense, at least one investment expense, and at least one insurance expense, wherein the right rectangle expenses ae beta expenses comprising at least one expense selected from the group consisting of an expense for replacement of at least one car, an expense for vacations, an expense for gifts, an expense for emergencies, and combinations thereof;
summing the 3-circles expenses and the additional alpha expenses to calculate a total alpha expense for the time interval;
summing the right rectangle expenses and the additional beta expenses to calculate a total beta expense for the time interval;
dividing a sum of the total alpha expense for the time interval and the total beta expense for the time interval by the time interval to calculate an average total expense for the time interval;
computing a cash flow for the time interval by subtracting the average total expense for the time interval from the average income for the time interval, wherein the computed cash flow is a negative cash flow or a non-negative cash flow; and
transmitting the computed cash flow to an output device of the computer system.

23. The computer program product of claim 22, wherein the method further comprises determining a flow of money for the time interval, said determining the money flow comprising:
obtaining save-to-spend expenses from a money flow data structure, said money flow data structure being a money flow worksheet stored in the electronic medium, wherein the save-to-spend expenses in the money flow worksheet are the right rectangle expenses in the expense worksheet;
determining a first portion of the average income for the time interval as a money flow that finances the save-to-spend expenses;
determining a remaining portion of the average income for the time interval as a money flow into a checking account or an equivalent thereof, wherein the remaining portion of the average income for the time interval is equal to a difference between the average income for the time interval and the first portion of the average income for the time interval;
determining a first portion of the money flow into the checking account as a first money flow from the checking account or an equivalent thereof that finances debt expenses;
determining a second portion of the money flow into the checking account as a second money flow from the checking account or an equivalent thereof that finances the at least one long-term savings expense;
determining a third portion of the money flow into the checking account as a third money flow from the checking account or an equivalent thereof that finances the at least one investment expense;
determining a fourth portion of the money flow into the checking account as a fourth money flow from the checking account or an equivalent thereof that finances the at least one insurance expense; and
determining a fifth portion of the money flow into the checking account as a fifth money flow from the checking account or an equivalent thereof that finances the additional alpha expenses.

24. The computer program product of claim 23, wherein said determining the first portion of the average income for the time interval, said determining the remaining portion of the average income for the time interval, said determining the first portion of the money flow from the checking account or an equivalent thereof, said determining the second portion of the money flow from the checking account or an equivalent thereof, said determining the third portion of the money flow from the checking account or an equivalent thereof, said determining the fourth portion of the money flow from the checking account or an equivalent thereof, and said determining the fifth portion of the money flow from the checking account or an equivalent thereof comprises using content in the money flow worksheet, wherein the content in the money flow worksheet comprises:
    a debt workblock comprising the debt expenses;
    a save-to-spend workblock comprising the save-to-spend expenses, wherein the save-to-spend workblock and the debt workblock are distinct from each other in the money flow worksheet;
    a savings icon denoting a long-term savings account or an equivalent thereof configured to accumulate long-term savings that finances the at least one long-term savings expense;
    an investment icon denoting at least one investment subject to market risk and configured to finance the at least one investment expense;
    an insurance icon denoting at least one insurance expense selected from the group consisting of an expense for life insurance, an expense for disability insurance, an expense for long-term health insurance, and combinations thereof;
    an income icon denoting the average income for the time interval;
    a checking icon denoting the checking account or an equivalent thereof;
    an additional alpha expenses icon denoting the additional alpha expenses;
    a directional flow indicator directed from the income icon to the save-to-spend workblock, denoting that the first portion of the average income for the time interval is directed to the save-to-spend workblock;
    a directional flow indicator directed from the income icon to the checking icon, denoting that the remaining portion of the average income for the time interval is directed to the checking account or an equivalent thereof;
    a directional flow indicator directed from the checking icon to the debt workblock, denoting the first portion of the money flow from the checking account or an equivalent thereof;
    a directional flow indicator directed from the checking icon to the savings icon, denoting the second portion of the money flow from the checking account or an equivalent thereof;
    a directional flow indicator directed from the checking icon to the investment icon, denoting the third portion of the money flow from the checking account or an equivalent thereof;
    a directional flow indicator directed from the checking icon to the insurance icon, denoting the fourth portion of the money flow from the checking account or an equivalent thereof; and
    a directional flow indicator directed from the checking icon to the additional alpha expenses icon, denoting the fifth portion of the money flow from the checking account or an equivalent thereof.

25. The computer program product of claim 24, wherein the method further comprises:
    displaying the money flow worksheet on a computer screen of the computer system.

26. The computer program product of claim 23, wherein the method further comprises:
    adding the first portion of the average income for the time interval to at least one save-to-spend savings vehicle;
    adding the remaining portion of the average income for the time interval to the checking account or an equivalent thereof;
    funding the debt expenses with the first portion of the money flow from the checking account or an equivalent thereof;
    funding the at least one long-term savings expense with the second portion of the money flow from the checking account or an equivalent thereof;
    funding the at least one investment expense with the third portion of the money flow from the checking account or an equivalent thereof;
    funding the at least one insurance expense with the fourth portion of the money flow from the checking account or an equivalent thereof; and
    funding the additional alpha expenses with the fifth portion of the money flow from the checking account or an equivalent thereof.

27. The computer program product of claim 26,
    wherein said funding the at least one long-term savings expense comprises directing the second portion of the money flow from the checking account or an equivalent thereof to a long-term savings account or an equivalent thereof selected from the group consisting of a conventional bank savings account, a money market certificate, a money market mutual fund, a short-term treasury bill, a United States savings bond, and combinations thereof,
    wherein said funding the at least investment expense comprises directing the third portion of the money flow from the checking account or an equivalent thereof to at least one investment subject to market risk selected from the group consisting of real estate, stocks, bonds, commodities, mutual funds, annuities, a self-employment retirement plan, a employee retirement plan, a 401(k) plan, an IRA, hard assets, and combinations thereof,
    wherein said funding the at least investment expense comprises directing the fourth portion of the money flow from the checking account or an equivalent thereof to at least one insurance selected from the group consisting of life insurance, disability insurance, long-term health care insurance, and combinations thereof.

28. The computer program product of claim 23, wherein the checking account or an equivalent thereof is selected from the group consisting of a conventional bank checking account, a money market checking account, a brokerage service checking account, and an Internet account.

29. The computer program product of claim 23, wherein the at least one save-to-spend savings vehicle is selected from the group consisting of a save-to-spend checking account, at least one money market mutual fund, a save-to-spend savings account, and combinations thereof.

30. The computer program product of claim 22, wherein the method further comprises:
    displaying the expense worksheet on a computer screen of the computer system.

31. The computer program product of claim 22,
    wherein the 3-circles expenses consist of the at least one long-term savings expense, the at least one investment expense, and the at least one insurance expense, and
    wherein the right rectangle expenses consist of the expense for replacement of at least one car, the expense for vacations, the expense for gifts, and the expense for emergencies.

* * * * *